(12) United States Patent
Park et al.

(10) Patent No.: US 11,719,951 B2
(45) Date of Patent: Aug. 8, 2023

(54) POLARIZATION SPECTRAL FILTER, POLARIZATION SPECTRAL FILTER ARRAY, AND POLARIZATION SPECTRAL SENSOR

(71) Applicant: SAMSUNG ELECTRONICS CO., LTD., Suwon-si (KR)

(72) Inventors: Yeonsang Park, Seoul (KR); Hyochul Kim, Yongin-si (KR); Jaesoong Lee, Suwon-si (KR); Younggeun Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 17/095,477

(22) Filed: Nov. 11, 2020

(65) Prior Publication Data

US 2021/0191141 A1 Jun. 24, 2021

(30) Foreign Application Priority Data

Dec. 20, 2019 (KR) .................. 10-2019-0171993

(51) Int. Cl.
  *G02B 27/28* (2006.01)
  *G01J 4/04* (2006.01)
  (Continued)

(52) U.S. Cl.
  CPC .............. *G02B 27/288* (2013.01); *G01J 4/04* (2013.01); *G02B 5/203* (2013.01); *G02B 5/286* (2013.01); *G02B 5/288* (2013.01)

(58) Field of Classification Search
  CPC .......... G01J 4/04; G02B 5/203; G02B 5/286; G02B 5/288
  (Continued)

(56) References Cited

U.S. PATENT DOCUMENTS 5,726,805 A 3/1998 Kaushik et al.
6,958,729 B1 10/2005 Metz
(Continued)

FOREIGN PATENT DOCUMENTS

EP 3546903 A2 10/2019
EP 3771892 A1 2/2021
KR 10-2019-0012062 A 2/2019

OTHER PUBLICATIONS

Communication dated May 25, 2021 issued by the European Patent Office in European Application No. 20211132.4.
(Continued)

*Primary Examiner* — Tarifur R Chowdhury
*Assistant Examiner* — Omar H Nixon
(74) *Attorney, Agent, or Firm* — Sughrue Mion, PLLC

(57) ABSTRACT

Provided is a polarization spectral filter, including: a first reflector and a second reflector disposed to face each other in a first direction; and a grating layer disposed between the first reflector and the second reflector. The grating layer includes a plurality of first grating elements and a plurality of second grating elements, the plurality of first grating elements and the plurality of second grating elements being alternately arranged in a second direction perpendicular to the first direction. The plurality of first grating elements include a first dielectric material having a first refractive index. The plurality of second grating elements include a second dielectric material having a second refractive index different from the first refractive index.

23 Claims, 19 Drawing Sheets

(51) Int. Cl.
  *G02B 5/20* (2006.01)
  *G02B 5/28* (2006.01)
(58) Field of Classification Search
  USPC .......................................................... 356/370
  See application file for complete search history.

(56) References Cited

U.S. PATENT DOCUMENTS

| | | |
|---|---|---|
| 7,426,040 B2 | 9/2008 | Kim et al. |
| 8,045,157 B2 | 10/2011 | Shibayama et al. |
| 8,759,742 B2 | 6/2014 | Yokogawa et al. |
| 9,052,454 B2 | 6/2015 | Vincent et al. |
| 10,393,580 B2 | 8/2019 | Kim et al. |
| 10,571,332 B2 | 2/2020 | Cho et al. |
| 2002/0080493 A1 | 6/2002 | Tsai et al. |
| 2006/0262250 A1 | 11/2006 | Hobbs |
| 2010/0053755 A1 | 3/2010 | Lee et al. |
| 2014/0061486 A1 | 3/2014 | Bao et al. |
| 2018/0045953 A1 | 2/2018 | Fan et al. |
| 2018/0059026 A1 | 3/2018 | Ye et al. |
| 2018/0107015 A1* | 4/2018 | Dumpelmann ........ G02B 5/008 |
| 2019/0049296 A1 | 2/2019 | Cho et al. |
| 2019/0086259 A1 | 3/2019 | Cho |
| 2019/0154503 A1 | 5/2019 | Yoon et al. |
| 2019/0244993 A1 | 8/2019 | Yamaguchi et al. |
| 2019/0277693 A1* | 9/2019 | Kim ........................ G01J 3/26 |
| 2020/0217796 A1 | 7/2020 | Kim et al. |
| 2020/0314983 A1 | 10/2020 | Park et al. |
| 2021/0017101 A1 | 1/2021 | Kriech et al. |
| 2021/0148755 A1 | 5/2021 | Lee et al. |

OTHER PUBLICATIONS

Yasushi Maruyama et al. 3.2-MP Back-Illuminated Polarization Image Sensor With Four-Directional Air-Gap Wire Grid and 2.5-pm Pixels IEEE Transactions on Electron Devices, vol. 65, No. 6, Jun. 2018 (8 pages total).

Noah A. Rubin et al. "Matrix Fourier optics enables a compact full-Stokes polarization camera" Science, 365, Jul. 5, 2019, retrieved from http://science.sciencemag.org/ on Jul. 17, 2019, (10 pages total).

Tomohiro Yamazaki et al. "Four-Directional Pixel-Wise Polarization CMOS Image Sensor Using Air-Gap Wire Grid on 2.5-pm Back-Illuminated Pixels" IEEE, 2016, (4 pages total).

* cited by examiner

POLARIZATION SPECTRAL FILTER, POLARIZATION SPECTRAL FILTER ARRAY, AND POLARIZATION SPECTRAL SENSOR

CROSS-REFERENCE TO RELATED APPLICATION

This application claims priority to Korean Patent Application No. 10-2019-0171993, filed on Dec. 20, 2019, in the Korean Intellectual Property Office, the disclosure of which is herein incorporated by reference in its entirety.

BACKGROUND

1. Field

Example embodiments consistent with the present disclosure relate to a polarization spectral filter, a polarization spectral filter array, and a polarization spectral sensor, and more particularly, to a polarization spectral filter and a polarization spectral filter array which are capable of selectively transmitting a light having a specified wavelength band and having a specified linear polarization component, and a polarization spectral sensor capable of simultaneously obtaining polarization information and spectral information on an incident light by using the polarization spectral filter array.

2. Description of Related Art

A spectroscope is widely used, for example, for analyzing agricultural conditions, mineral distribution, vegetation on a ground surface, pollution, and the like by capturing a ground image via a drone, satellite, an aircraft, and the like. Such analysis is used in various fields such as food safety, skin/face analysis, authentication and recognition, and biological tissue analysis. Recently, applications using a spectroscope have been expanded to other fields such as mobile healthcare.

A polarization image may provide additional information such as pressure, surface defects, and scratches in addition to general red, green, and blue (RGB) information. This additional information may be used in applications for industrial equipment, automotive application components, etc. In addition, a polarization image may enable more accurate object identification even in a cloudy or foggy weather.

Accordingly, the application fields of sensors capable of obtaining a spectral image or polarization image have been expanded. In addition, as an image sensor is miniaturized and a resolution thereof is increased, research has been conducted to obtain a spectral image or a polarization image with a high resolution by integrating the image sensor with other devices.

SUMMARY

One or more example embodiments provide a polarization spectral filter and a polarization spectral filter array which are both capable of selectively transmitting light in a specified wavelength band and having a specified linear polarization component.

In addition, one or more example embodiments provide a polarization spectral sensor capable of simultaneously obtaining polarization information and spectral information on an incident light by using the polarization spectral filter array.

According to an aspect of an example embodiment, there is provided a polarization spectral filter including: a first reflector; a second reflector, the first reflector and the second deflector being disposed to face each other in a first direction; and a grating layer disposed between the first reflector and the second reflector, wherein the grating layer includes a plurality of first grating elements and a plurality of second grating elements, the first grating elements and the second grating elements being alternately arranged with each other in a second direction perpendicular to the first direction, wherein each of the plurality of first grating elements includes a first dielectric material having a first refractive index, and wherein each of the plurality of second grating elements includes a second dielectric material having a second refractive index different from the first refractive index.

Each of the first grating elements and the second grating elements may have a rod shape, and the plurality of first grating elements and the plurality of second grating elements may be arranged one-dimensionally.

A first surface of each of the plurality of first grating elements and a first surface of each of the plurality of second grating elements may be in contact with the first reflector, and a second surface of each of the plurality of first grating elements, opposite to the first surface of each of the plurality of first grating elements, and a second surface of each of the plurality of second grating elements, opposite to the first surface of each of the plurality of second grating elements, may be in contact with the second reflector.

Based on at least one of thicknesses of the plurality of first grating elements and the plurality of second grating elements, arrangement periods of the plurality of first grating elements and arrangement periods of the plurality of second grating elements, and a ratio of the plurality of first grating elements to the plurality of second grating elements, the polarization spectral filter may be configured to transmit therethrough light in a first wavelength band, from among light having a first linear polarization component, and transmit therethrough light in a second wavelength band different from the first wavelength band, from among light having a second linear polarization component perpendicular to the first linear polarization component.

The thicknesses of each of the plurality of first grating elements and each of the plurality of second grating elements may be approximately 90 nm to approximately 350 nm.

The arrangement periods of the plurality of first grating elements and the arrangement periods of the plurality of second grating elements may be in a range from approximately 150 nm to approximately 300 nm.

The ratio of the plurality of first grating elements to the plurality of second grating elements may be in a range from approximately 0.2 to approximately 0.7.

The first dielectric material and the second dielectric material may be transparent with respect to the light in the first wavelength band and the light in the second wavelength band.

The polarization spectral filter may further include a band pass filter disposed on a surface of the first reflector, the band pass filter being configured to block the light in the first wavelength band and to transmit therethrough the light in the second wavelength band.

The polarization spectral filter may further include a quarter wave plate disposed on a surface of the first reflector.

The first reflector may include a plurality of first dielectric layers and a plurality of second dielectric layers, the plurality of first dielectric layers and the plurality of second dielectric layers being alternately stacked with each other in a third direction, the second reflector may include a plurality of third dielectric layers and a plurality of fourth dielectric layers, the plurality of third dielectric layers and the plurality of fourth dielectric layers being alternately stacked with each other in the third direction, each of the plurality of first dielectric layers may include a dielectric material having a refractive index that is different from a dielectric material included in each of the plurality of second dielectric layers, and each of the third dielectric layers may include a dielectric material having a refractive index that is different from a dielectric material included in each of the plurality of fourth dielectric layers.

Each of the plurality of first dielectric layers and each of the plurality of third dielectric layers may include the first dielectric material, and each of the plurality of second dielectric layers and each of the plurality of fourth dielectric layers may include the second dielectric material.

The grating layer further may include a plurality of third grating elements, each of the plurality of third grating elements including a third dielectric material having a third refractive index different from the first refractive index and the second refractive index, and the plurality of first grating elements, the plurality of second grating elements, and the plurality of third grating elements may be alternately with each other arranged in the second direction.

According to an aspect of an example embodiment, there is provided a polarization spectral filter array, including: a plurality of unit filter arrays that are two-dimensionally arranged, wherein each of the unit filter arrays includes a first polarization spectral filter set configured to transmit therethrough light in a first wavelength band, and a second polarization spectral filter set configured to transmit therethrough light in a second wavelength band different from the first wavelength band, the first polarization spectral filter set includes a first polarization spectral filter configured to transmit therethrough light having a first linear polarization component, from among the light in the first wavelength band, and a second polarization spectral filter configured to transmit therethrough light having a second linear polarization component perpendicular to the first linear polarization component, from among the light in the first wavelength band, the second polarization spectral filter set includes a third polarization spectral filter configured to transmit therethrough the light having the first linear polarization component, from among the light in the second wavelength band, and a fourth polarization spectral filter configured to transmit therethrough the light having the second linear polarization component, from among the light in the second wavelength band, each of the first polarization spectral filter, the second polarization spectral filter, the third polarization spectral filter, and the fourth polarization spectral filter includes a first reflector and a second reflector disposed to face each other in a first direction, and a grating layer disposed between the first reflector and the second reflector, the grating layer includes a plurality of first grating elements and a plurality of second grating elements, the plurality of first grating elements and the plurality of second grating elements being alternately arranged with each other in a second direction perpendicular to the first direction, each of the plurality of first grating elements includes a first dielectric material having a first refractive index, and each of the plurality of second grating elements includes a second dielectric material having a second refractive index different from the first refractive index.

The plurality of first grating elements and the plurality of second grating elements of the grating layer of the second polarization spectral filter may be rotated by 90 degrees, on a plane perpendicular to the first direction, with respect to the plurality of first grating elements and the plurality of second grating elements of the grating layer of the first polarization spectral filter, and the plurality of first grating elements and the plurality of second grating elements of the grating layer of the fourth polarization spectral filter may be rotated by 90 degrees, on the plane perpendicular to the first direction, with respect to the plurality of first grating elements and the plurality of second grating elements of the grating layer of the third polarization spectral filter.

Each of the plurality of first grating elements and each of the plurality of second grating elements may have a rod shape, and the plurality of first grating elements and the plurality of second grating elements may be one-dimensionally arranged.

With respect to each of the first polarization spectral filter, the second polarization spectral filter, the third polarization spectral filter, and the fourth polarization spectral filter, based on at least one of thicknesses of the plurality of first grating elements and the plurality of second grating elements, arrangement periods of the plurality of first grating elements and arrangement periods of the plurality of second grating elements, and a ratio of the plurality of first grating elements to the plurality of second grating elements, the first polarization spectral filter may be further configured to transmit therethrough the light in the first wavelength band from among the light having the first linear polarization component, the second polarization spectral filter may be further configured to transmit therethrough the light in the first wavelength band from among the light having the second linear polarization component, the third polarization spectral filter may be further configured to transmit therethrough the light in the second wavelength band from among the light having the first linear polarization component, and the fourth polarization spectral filter may be further configured to transmit therethrough the light in the second wavelength band from among the light having the second linear polarization component.

A width and the thickness of each of the plurality first grating element of the first polarization spectral filter, a width and the thickness of each of the plurality of second grating elements of the first polarization spectral filter, and the ratio of the plurality of first grating elements to the plurality of second grating elements of the first polarization spectral filter may be respectively the same as a width and the thickness of each of the plurality of first grating elements of the second polarization spectral filter, a width and the thickness of each of the plurality of second grating elements of the second polarization spectral filter, and the ratio of the plurality of first grating elements to the plurality of second grating elements of the second polarization spectral filter, and a width and the thickness of each of the plurality of first grating elements of the third polarization spectral filter, a width and the thickness of each of the plurality of second grating elements of the third polarization spectral filter, and the ratio of the plurality of first grating elements to the plurality of second grating elements of the third polarization spectral filter may be respectively the same as a width and the thickness of each of the plurality of first grating elements of the fourth polarization spectral filter, a width and the thickness of each of the plurality of second grating elements of the fourth polarization spectral filter, and the ratio of the plurality of first grating elements to the plurality of second grating elements of the fourth polarization spectral filter.

Each of the first polarization spectral filter, the second polarization spectral filter, the third polarization spectral filter, and the fourth polarization spectral filter may further include a band pass filter disposed on a surface of the first reflector, the band pass filter being configured to transmit therethrough the light in the first wavelength band and the second wavelength band and to block light in other wavelength bands.

The first polarization spectral filter set may further include a fifth polarization spectral filter configured to transmit therethrough light having a third linear polarization component rotated by 45 degrees with respect to the first linear polarization component, from among the light in the first wavelength band, the second polarization spectral filter set may further include a sixth polarization spectral filter configured to transmit therethrough the light having the third linear polarization component rotated by 45 degrees with respect to the first linear polarization component, from among the light in the second wavelength band, and each of the fifth polarization spectral filter and the sixth polarization spectral filter may include the first reflector, the second reflector, and the grating layer.

The plurality of first grating elements and the plurality of second grating elements of the grating layer of the fifth polarization spectral filter may be rotated by 45 degrees, on a plane perpendicular to the first direction, with respect to the plurality of first grating elements and the plurality of second grating elements of the grating layer of the first polarization spectral filter, and the plurality of first grating elements and the plurality of second grating elements of the grating layer of the sixth polarization spectral filter may be rotated by 45 degrees, on the plane perpendicular to the first direction, with respect to the plurality of first grating elements and the plurality of second grating elements of the grating layer of the third polarization spectral filter.

The first polarization spectral filter set may further include a fifth polarization spectral filter configured to transmit therethrough the light having the first linear polarization component from among the light having the first wavelength band, the second polarization spectral filter set may further include a sixth polarization spectral filter configured to transmit therethrough the light having the first linear polarization component from among the light in the second wavelength band, each of the fifth polarization spectral filter and the sixth polarization spectral filter may include the first reflector, the second reflector, the grating layer, and a quarter wave plate disposed on a surface of the first reflector.

According to an aspect of an example embodiment, there is provided polarization spectral sensor including: a polarization spectral filter array including a plurality of unit filter arrays arranged two-dimensionally; and an image sensor including a plurality of sensing pixels arranged two-dimensionally, the plurality of sensing pixels being configured to sense intensity of light transmitting through the polarization spectral filter array, wherein each of the plurality of unit filter arrays includes a first polarization spectral filter set through which light in a first wavelength band transmits; and a second polarization spectral filter set through which light in a second wavelength band different from the first wavelength band transmits, wherein the first polarization spectral filter set includes a first polarization spectral filter configured to transmit therethrough light having a first linear polarization component, from among the light in the first wavelength band; and a second polarization spectral filter configured to transmit therethrough light having a second linear polarization component perpendicular to the first linear polarization component, from among the light having the first wavelength band, wherein the second polarization spectral filter set includes a third polarization spectral filter configured to transmit therethrough the light having the first linear polarization component, from among the light in the second wavelength band; and a fourth polarization spectral filter configured to transmit therethrough the light having the second linear polarization component, from among the light in the second wavelength band, wherein each of the first polarization spectral filter, the second polarization spectral filter, the third polarization spectral filter, and the fourth polarization spectral filter includes a first reflector and a second reflector disposed to face each other in a first direction; and a grating layer disposed between the first reflector and the second reflector, wherein the grating layer includes a plurality of first grating elements and a plurality of second grating elements, the plurality of first grating elements and the plurality of second grating elements being alternately arranged with each other in a second direction perpendicular to the first direction, wherein each of the plurality of first grating elements includes a first dielectric material having a first refractive index, and wherein each of the plurality of second grating elements includes a second dielectric material having a second refractive index different from the first refractive index.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
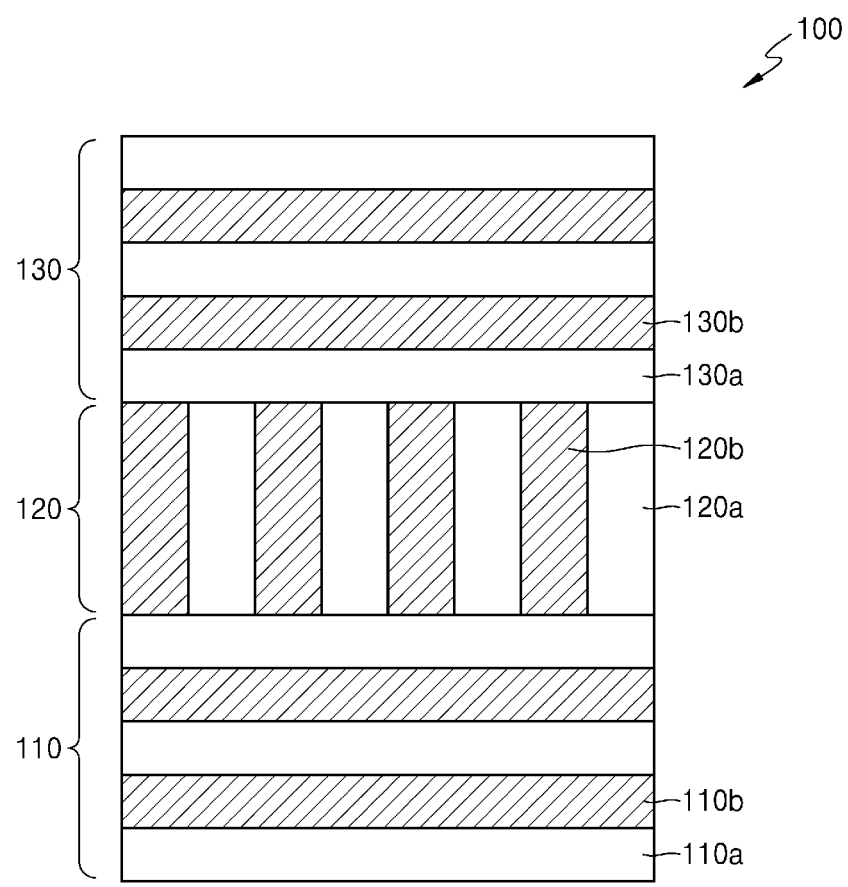
FIG. 1 is a cross-sectional view schematically illustrating a configuration of a polarization spectral filter according to an example embodiment.

Hereinafter, a polarization spectral filter, a polarization spectral filter array, and a polarization spectral sensor according to example embodiments will be described in detail with reference to the accompanying drawings. In the drawings, like reference numerals refer to like elements, and a size of each element in the drawings may be exaggerated for clarity and convenience of description. In addition, the example embodiments to be described below are merely examples, and various modifications are possible from the example embodiments.

Hereinafter, what is described as "over" or "on" may include not only directly over and in contact but also over without being in contact. A singular expression includes the plurality of expressions unless the context clearly indicates otherwise. In addition, when a part is described to "include" a certain configuration element, which means that the part may further include other configuration elements, except to exclude other configuration elements unless otherwise stated.

A term "above-described" and similar terminology may be used for the singular and the plural. If a sequence of steps configuring a method is apparently described or there is no contradictive description, the sequence may be performed in a proper order and is not limited to the described order.

In addition, terms such as " . . . unit/portion", "module", and the like described in the specification mean a unit for processing at least one function or operation, which may be implemented as hardware or software or a combination of the hardware and the software.

Connections of lines between configuration elements or connection members illustrated in the drawings represent functional connections and/or physical or circuit connections by way of example and may be replaced or represented as additional various functional connections, physical connections, or circuit connections in the actual device.

All examples or certain terms are used simply for the purpose of describing technical concepts in detail, and the scope is not limited by the examples or terms unless defined by the claims.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

FIG. 1 is a cross-sectional view schematically illustrating a configuration of a polarization spectral filter according to an example embodiment. Referring to FIG. 1, a polarization spectral filter 100 according to an example embodiment may include a first reflector 110, a grating layer 120 disposed on the first reflector 110, and a second reflector 130 disposed on the grating layer 120. Accordingly, the first reflector 110 and the second reflector 130 may be disposed to face each other in a thickness direction (or a top to bottom direction of the polarization spectral filter 100), and the grating layer 120 may be disposed between the first reflector 110 and the second reflector 130.

The first reflector 110 and the second reflector 130 may be, for example, a distributed Bragg reflector (DBR) formed by stacking repeatedly and alternately two dielectric layers having different refractive indices. For example, the first reflector 110 may include a plurality of first dielectric layers 110a and a plurality of second dielectric layers 110b that are alternately stacked in the thickness direction. The second reflector 130 may include a plurality of third dielectric layers 130a and a plurality of fourth dielectric layers 130b that are alternately stacked in the thickness direction. Each of the first dielectric layers 110a and each of the second dielectric layers 110b may include dielectric materials having different refractive indices. In addition, each of the third dielectric layers 130a and each of the fourth dielectric layers 130b may also include dielectric materials having different refractive indices. For example, each of the first dielectric layers 110a may include a first dielectric material having a first refractive index, and each of the second dielectric layers 110b may include a second dielectric material having a second refractive index different from the first refractive index, and each of the third dielectric layers 130a may include a third dielectric material having a third refractive index, and each of the fourth dielectric layers 130b may include a fourth dielectric material having a fourth refractive index different from the third refractive index.

For example, the first dielectric layers 110a and the second dielectric layers 110b may include two different dielectric materials selected from Si, $TiO_2$, $SiO_2$, and $Si_2N_3$, and the third dielectric layers 130a and the fourth dielectric layers 130b may also include two different dielectric materials selected from Si, $TiO_2$, $SiO_2$, and $Si_2N_3$. For example, the first dielectric layers 110a may have a dielectric material that is selected from Si, $TiO_2$, $SiO_2$, and $Si_2N_3$, and the second dielectric layers 110b may have another dielectric material that is selected from Si, $TiO_2$, $SiO_2$, and $Si_2N_3$. In addition, the first dielectric layers 110a of the first reflector 110 and the third dielectric layers 130a of the second reflector 130 may include the same dielectric material, and the second dielectric layers 110b of the first reflector 110 and the fourth dielectric layers 130b of the second reflector 130 may include the same dielectric material. Alternatively, the first dielectric layers 110a of the first reflector 110 and the fourth dielectric layers 130b of the second reflector 130 may include the same dielectric material, and the second dielectric layers 110b of the first reflector 110 and the third dielectric layers 130a of the second reflector 130 may include the same dielectric material.

According to structures of the first reflector 110 and the second reflector 130, reflection occurs at an interface between the first dielectric layers 110a and the second dielectric layers 110b having different refractive indices, and occurs at an interface between the third dielectric layers 130a and the fourth dielectric layers 130b having different refractive indices, and high reflectance may be obtained by matching phases of all the reflected light. To this end, an optical thickness (that is, a value obtained by multiplying a physical thickness by a refractive index of a material of the layer) of each of the first to the fourth dielectric layers 110a, 110b, 130a, and 130b may be selected as approximately a quarter of a wavelength band of light to be transmitted through the polarization spectral filter 100.

The first reflector 110 and the second reflector 130 disposed to face each other may form a resonator to resonate light. The grating layer 120 may be disposed inside the resonator formed by the first reflector 110 and the second reflector 130. Light incident through an upper surface of the first reflector 110 may be emitted through a lower surface of the second reflector 130 while resonating between the first reflector 110 and the second reflector 130. The light passes through the grating layer 120 repeatedly while resonating between the first reflector 110 and the second reflector 130. Thus, properties of the light emitted through the lower surface of the second reflector 130 may be mainly determined by a structure of the grating layer 120.

In an example embodiment, the grating layer 120 may be configured to have polarization dependent properties. To this end, the grating layer 120 may include a plurality of first grating elements 120a and a plurality of second grating elements 120b alternately arranged in a horizontal direction perpendicular to the thickness direction. For example, the plurality of first grating elements 120a and the plurality of second grating elements 120b may be arranged such that lower surfaces of the plurality of first grating elements 120a in the thickness direction and lower surfaces of the plurality of second grating elements 120b in the thickness direction are in contact with the first reflector 110 and are located on the same plane, and upper surfaces of the plurality of first grating elements 120a in the thickness direction and upper surfaces of the plurality of second grating elements 120b in the thickness direction are in contact with the second reflector 130 and are located on the same plane.

The first grating elements 120a and the second grating elements 120b may include dielectric materials having different refractive indices. In other words, each of the first grating elements 120a may include a first dielectric material having a first refractive index, and each of the second grating elements 120b may include a second dielectric material having a second refractive index different from the first refractive index. For example, the first grating elements 120a and the second grating elements 120b may include two different dielectric materials selected from Si, $TiO_2$, $SiO_2$, and $Si_2N_3$. In addition to the above examples of materials, the first dielectric material and the second dielectric material respectively forming the first grating elements 120a and the second grating elements 120b may include materials transparent with respect to light of a transmission wavelength band of the polarization spectral filter 100.

In addition, the first grating elements 120a may include the same dielectric material as the first dielectric layers 110a of the first reflector 110 and the third dielectric layers 130a of the second reflector 130, and the second grating elements 120b may include the same dielectric material as the second dielectric layers 110b of the first reflector 110 and the fourth dielectric layers 130b of the second reflector 130. Alternatively, the first grating elements 120a may include the same dielectric material as the first dielectric layers 110a of the first reflector 110 and the fourth dielectric layers 130b of the second reflector 130, and the second grating elements 120b may include the same dielectric material as the second dielectric layers 110b of the first reflector 110 and the third dielectric layers 130a of the second reflector 130.

Figure 2:
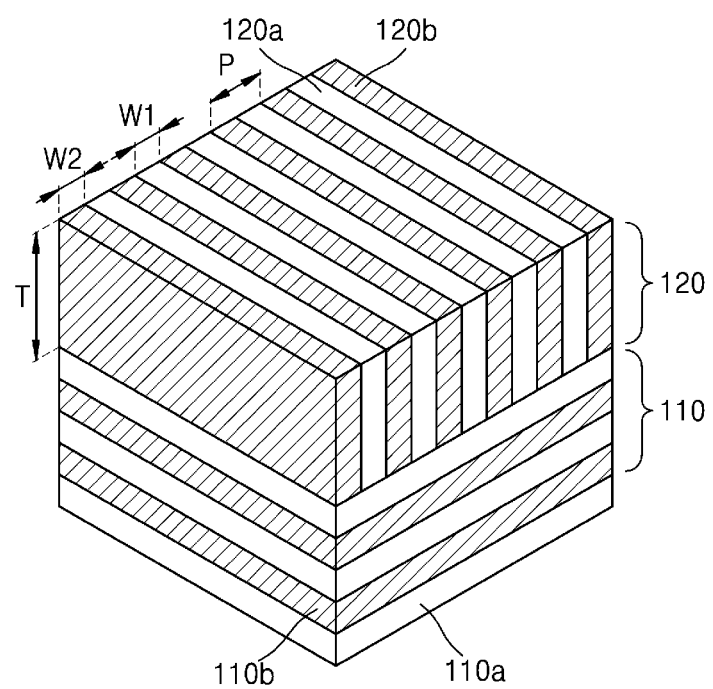
FIG. 2 is a perspective view schematically illustrating a configuration of a grating layer of the polarization spectral filter illustrated in FIG. 1.

FIG. 2 is a perspective view schematically illustrating a configuration of the grating layer 120 of the polarization spectral filter 100 illustrated in FIG. 1. Referring to FIG. 2, each of the first grating elements 120a and each of the second grating elements 120b of the grating layer 120 may have a shape of a rod extending in a longitudinal direction. In addition, the plurality of first grating elements 120a and the plurality of second grating elements 120b are arranged alternately and repeatedly in a width direction thereof. The first grating elements 120a and the second grating elements 120b have the same thickness T. In addition, the plurality of first grating elements 120a have the same width W1, and the plurality of second grating elements 120b have the same width W2. Thus, the plurality of first grating elements 120a and the plurality of second grating elements 120b are arranged in a constant period P.

Since the plurality of first grating elements 120a and the plurality of second grating elements 120b are one-dimensionally arranged in the above-described manner, the grating layer 120 and the polarization spectral filter 100 may have polarization dependent properties. For example, among light resonating between the first reflector 110 and the second reflector 130, transmittance of the polarization spectral filter 100 for light having a polarization component parallel to a longitudinal direction of the first grating elements 120a and the second grating elements 120b may be different from transmittance of the polarization spectral filter 100 for light having a polarization component perpendicular to the longitudinal direction of the first grating elements 120a and the second grating elements 120b. Particularly, in the polarization spectral filter 100 according to an example embodiment, a transmission wavelength band may change depending on a polarization direction of light beam.

Figure 3:
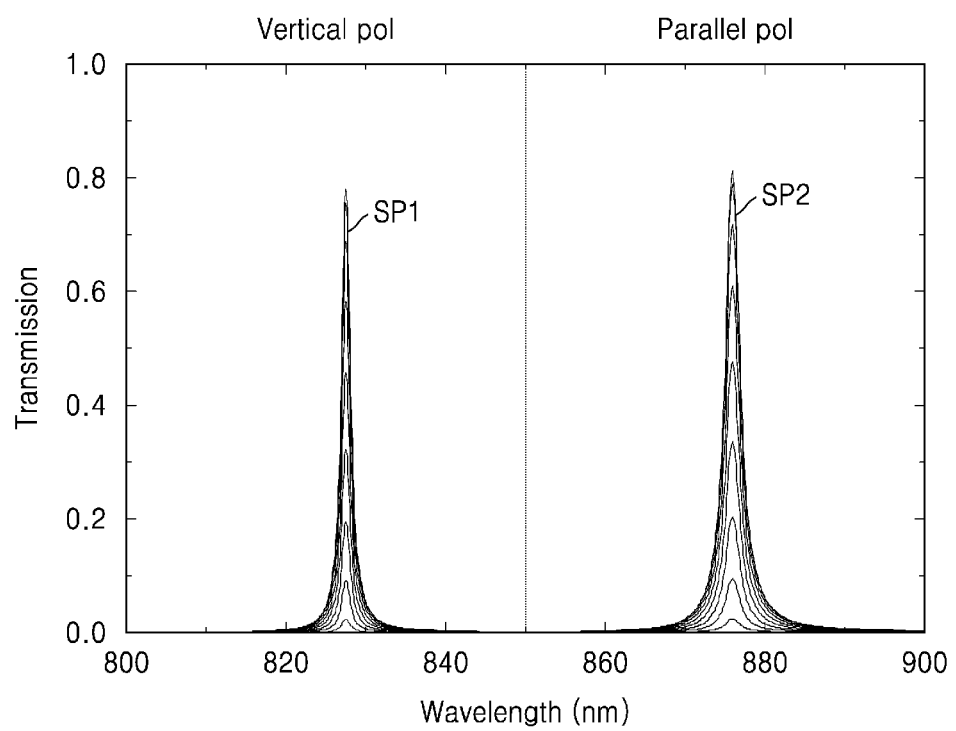
FIG. 3 shows graphs illustrating an example of transmission properties of the polarization spectral filter illustrated in FIG. 1.

FIG. 3 illustrates graphs illustrating an example of transmission properties of the polarization spectral filter 100 illustrated in FIG. 1. Referring to FIG. 3, a wavelength of light transmitted through the polarization spectral filter 100 may have peaks in two narrow wavelength bands separated from each other. For example, the light transmitted through the polarization spectral filter 100 may have a first spectrum SP1 having a center wavelength of approximately 825 nm and a second spectrum SP2 having a center wavelength of approximately 875 nm. The first spectrum SP1 and the second spectrum SP2 may have narrow wavelength widths. For example, a full width at half maximum (FWHM) of the first spectrum SP1 and a FWHM of the second spectrum SP2 may range from approximately 1 nm to approximately 10 nm. Accordingly, the first spectrum SP1 and the second spectrum SP2 may not overlap each other, and transmittance of the polarization spectral filter 100 is approximately zero in a wavelength band between the first spectrum SP1 and the second spectrum SP2. The FWHM of the first spectrum SP1 and the FWHM of the second spectrum SP2 may be reduced as the number of pairs of the first dielectric layers 110a and the second dielectric layers 110b included in the first reflector 110 and the number of pairs of the third dielectric layers 130a and the fourth dielectric layers 130b included in the second reflector 130 increase.

Particularly, light of the first spectrum SP1 may have a polarization component perpendicular to the longitudinal direction of the first grating elements 120a and the second grating elements 120b of the grating layer 120, and light of the second spectrum SP2 may have a polarization component parallel to the longitudinal direction of the first grating elements 120a and the second grating elements 120b of the grating layer 120. Accordingly, the polarization spectral filter 100 may have two different transmission wavelength bands having polarization directions perpendicular to each other. In other words, the polarization spectral filter 100 may have two different transmission wavelength bands, and the polarization spectral filter 100 may have polarization properties perpendicular to each other for the two transmission wavelength bands.

Figure 4:
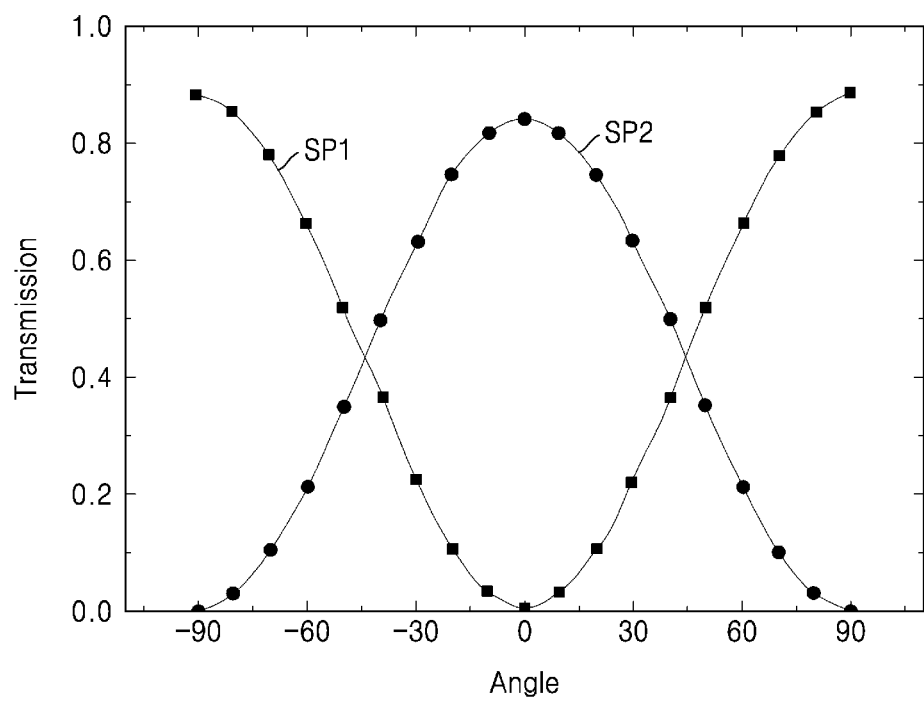
FIG. 4 is a graph illustrating an example of transmission properties according to polarization angles of two different transmission wavelength bands of the polarization spectral filter illustrated in FIG. 1.

FIG. 4 is a graph illustrating an example of the transmission properties according to polarization angles of the two different transmission wavelength bands of the polarization spectral filter 100 illustrated in FIG. 1. Referring to FIG. 4, in the light of the first spectrum SP1, light parallel to the longitudinal direction of the first grating elements 120a and the second grating elements 120b may have transmittance of approximately zero for the polarization spectral filter 100. In the light of the first spectrum SP1, light perpendicular to the longitudinal direction of the first grating elements 120a and the second grating elements 120b may have transmittance of approximately 0.9 for the polarization spectral filter 100. On the other hand, in the light of the second spectrum SP2, light perpendicular to the longitudinal direction of the first grating elements 120a and the second grating elements 120b may have transmittance of approximately zero for the polarization spectral filter 100. In addition, in the light of the second spectrum SP2, light parallel to the longitudinal direction (or length direction) of the first grating elements 120a and the second grating elements 120b may have transmittance of approximately 0.9 for the polarization spectral filter 100.

Specific transmission wavelength bands and polarization properties of the polarization spectral filter 100 may be determined by the thickness T of each of the first grating elements 120a and each of the second grating elements 120b, the arrangement period P of the plurality of first grating elements 120a and the plurality of second grating elements 120b, and a ratio of the first grating elements 120a and the second grating elements 120b, and the like. For example, thicknesses of each of the first grating elements 120a and each of the second grating elements 120b may range from approximately 90 nm to approximately 350 nm. In addition, the arrangement period P of the plurality of first grating elements 120a and the plurality of second grating elements 120b may range from 150 nm to 300 nm.

Accordingly, a size of each of the first grating elements 120a and a size of each of the second grating elements 120b may be smaller than the transmission wavelength of the polarization spectral filter 100. For example, the thickness of each of the first grating elements 120a and the thickness of each of the second grating elements 120b may be smaller than ½ or ⅓ of the transmission wavelength of the polarization spectral filter 100. In addition, the arrangement period P of the plurality of first grating elements 120a and the plurality of second grating elements 120b may be less than ½ or ⅓ of the transmission wavelength of the polarization spectral filter 100.

Since the first grating elements 120a and the second grating elements 120b have the same thickness T, a ratio of the first grating elements 120a to the second grating elements 120b may be the same as a ratio of a width W1 of the first grating elements 120a to a width W2 of the second grating elements 120b. For example, when the first refractive index of the first dielectric material forming the first grating elements 120a is lower than the second refractive index of the second dielectric material forming the second grating elements 120b, the ratio (W1/W2) between the first grating elements 120a and the second grating elements 120b may range from approximately 0.2 to approximately 0.7.

The thickness T of the first grating elements 120a and the second grating elements 120b and the arrangement period P of the plurality of first grating elements 120a and the plurality of second grating elements 120b is fixed, and by adjusting the ratio (W1/W2) between the first grating elements 120a and the second grating elements 120b, the transmission properties of the polarization spectral filter 100 may be adjusted.

Figure 5:
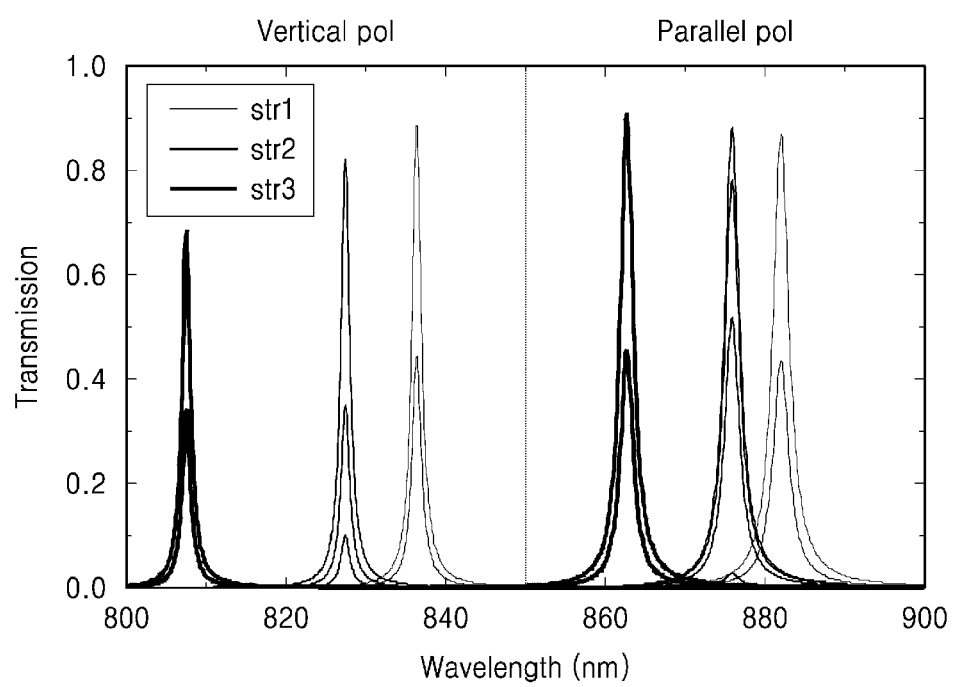
FIG. 5 shows graphs illustrating an example of a change in transmission properties of the polarization spectral filter illustrated in FIG. 1.

FIG. 5 illustrates graphs illustrating an example of a change in the transmission properties of the polarization spectral filter 100 illustrated in FIG. 1 according to a change in the ratio (W1/W2) between the first grating elements 120a and the second grating elements 120b of the grating layer 120. In FIG. 5, a graph marked as "str1" represents a case where the ratio (W1/W2) between the first grating elements 120a and the second grating elements 120b is 0.7, a graph marked as "str2" represents a case where the ratio (W1/W2) between the first grating elements 120a and the second grating elements 120b is 0.5, and a graph marked as "str3" represents a case where the ratio (W1/W2) between the first grating elements 120a and the second grating elements 120b is 0.3. In addition, in FIG. 5, three peaks on the left represent polarization components perpendicular to the longitudinal direction of the first grating elements 120a and the second grating elements 120b of the grating layer 120, and three peaks on the right represent polarization components parallel to the longitudinal direction of the first grating elements 120a and the second grating elements 120b of the grating layer 120. Referring to FIG. 5, it may be seen that, as the ratio (W1/W2) between the first grating elements 120a and the second grating elements 120b increases, two transmission wavelength bands of the polarization spectral filter 100 are increased and thus gradually move toward a longer wavelength.

Although it is described above that the grating layer 120 includes only the first grating elements 120a and the second grating elements 120b, the grating layer 120 according to example embodiments is not limited thereto. The grating layer 120 may be configured by alternately arranging three, four, or more grating elements having different refractive indices. The number of grating elements alternately arranged in the grating layer 120 is not limited.

Figure 6:
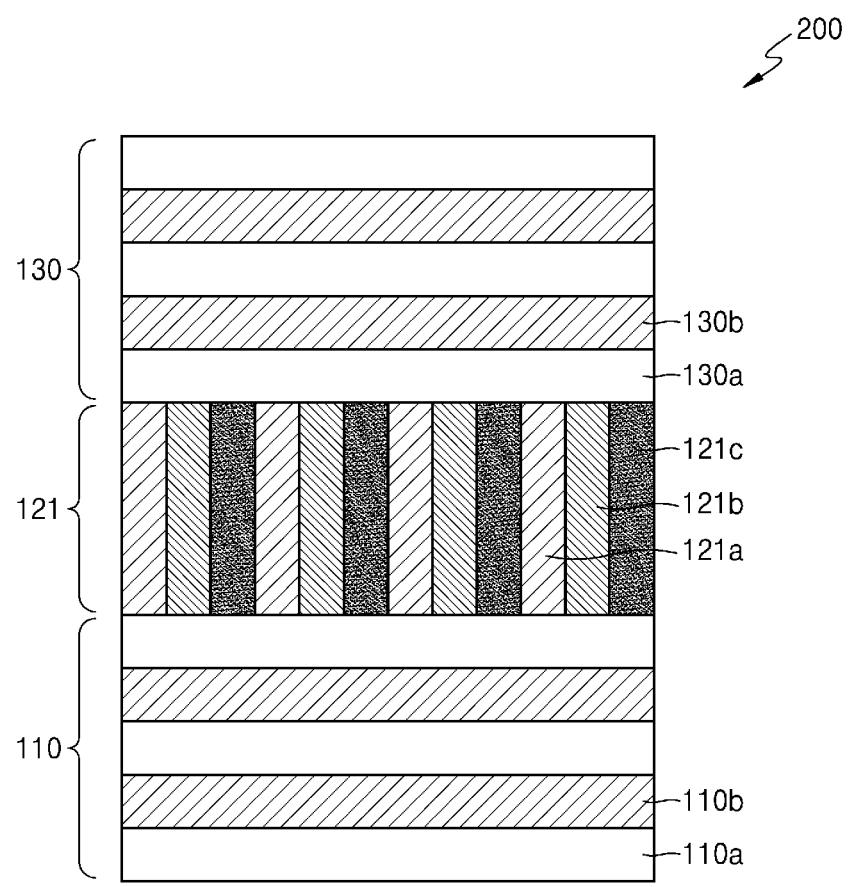
FIG. 6 is a cross-sectional view schematically illustrating a configuration of a polarization spectral filter according to example embodiment.

FIG. 6 is a cross-sectional view schematically illustrating a configuration of a polarization spectral filter according to example embodiment. A polarization spectral filter 200 illustrated in FIG. 6 is similar to the configuration of the polarization spectral filter 100 illustrated in FIG. 1, except that the grating layer 121 includes three grating elements. Referring to FIG. 6, the grating layer 121 may include a plurality of first grating elements 121a, a plurality of second grating elements 121b, and a plurality of third grating elements 121c, which are arranged alternately. Each of the first grating elements 121a includes a first dielectric material having a first refractive index, each of the second grating elements 121b includes a second dielectric material having a second refractive index different from the first refractive index, and each of the third grating elements 121c may include a third dielectric material having a third refractive index different from the first refractive index and the second refractive index. The plurality of first grating elements 121a, the plurality of second grating elements 121b, and the plurality of third grating elements 121c may be one-dimensionally arranged in a horizontal direction perpendicular to a thickness direction.

Referring back to the graphs of FIGS. 3 and 5, the polarization spectral filter 100 may have two different transmission wavelength bands having polarization properties perpendicular to each other. In addition, the two transmission wavelength bands may be completely separated from each other and may not overlap each other. Accordingly, if only one transmission wavelength band is selected from the two different transmission wavelength bands, the polarization spectral filter 100 may be configured to transmit only light having a specified polarization component from among light beams in specified transmission wavelength bands. Alternatively, a method of selecting one transmission wavelength band in a polarization spectral filter according to another example embodiment is described below.

Figure 7:
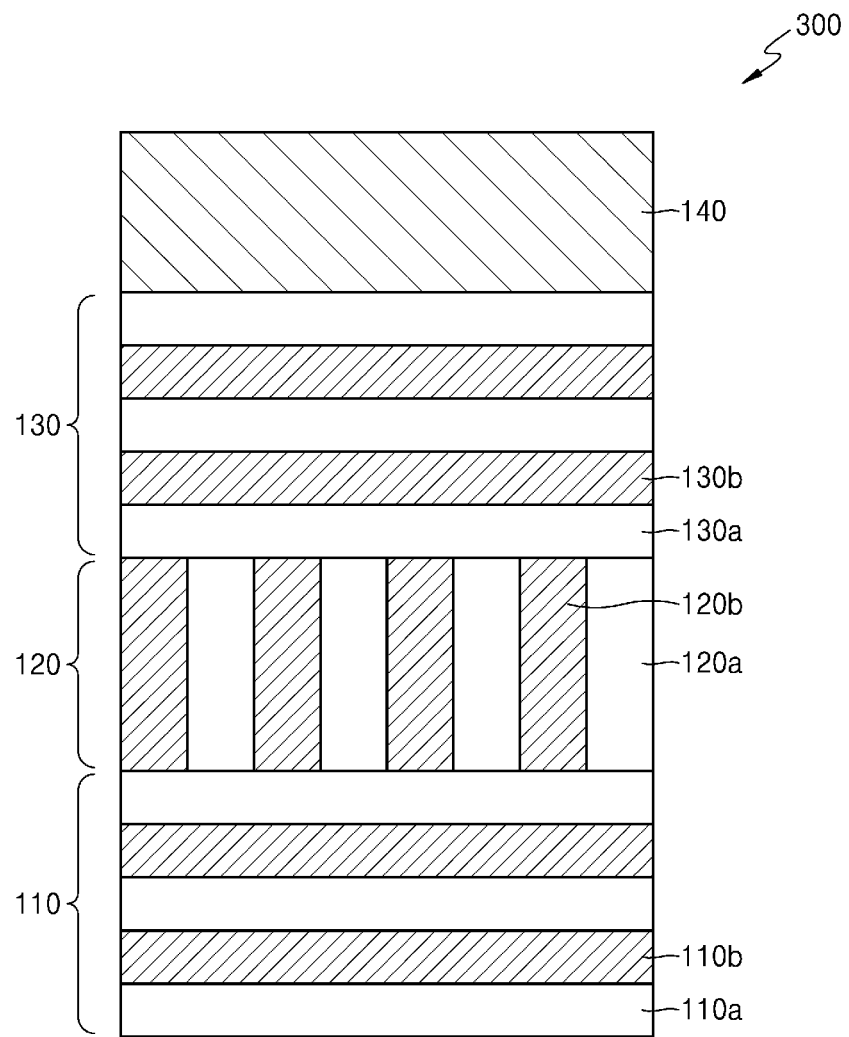
FIG. 7 is a cross-sectional view schematically illustrating a configuration of a polarization spectral filter according to example embodiment.

FIG. 7 is a cross-sectional view schematically illustrating a configuration of a polarization spectral filter according to example embodiment. A polarization spectral filter 300 illustrated in FIG. 7 is similar to the configuration of the polarization spectral filter 100 illustrated in FIG. 1 except that the polarization spectral filter 300 further includes a band pass filter 140 disposed on an upper surface of the second reflector 130. In other words, the band pass filter 140 is disposed on a light incident surface of the polarization spectral filter 300. The band pass filter 140 may be configured to allow only one wavelength band to pass therethrough from among the wavelength band of the first spectrum SP1 and the wavelength band of the second spectrum SP2 illustrated in FIG. 3 and configured to block the other wavelength band. For example, the band pass filter 140 may be configured to block light in a wavelength range of 800 nm to 850 nm and configured to transmit light in a wavelength range of 850 nm to 900 nm therethrough. Then, the polarization spectral filter 300 may be configured to transmit only light of the second spectrum SP2 having polarization components parallel to a longitudinal direction of the first grating elements 120a and the second grating elements 120b therethrough, and block light of the first spectrum SP1 having polarization components perpendicular to the longitudinal direction of the first grating elements 120a and the second grating elements 120b.

Figure 8:
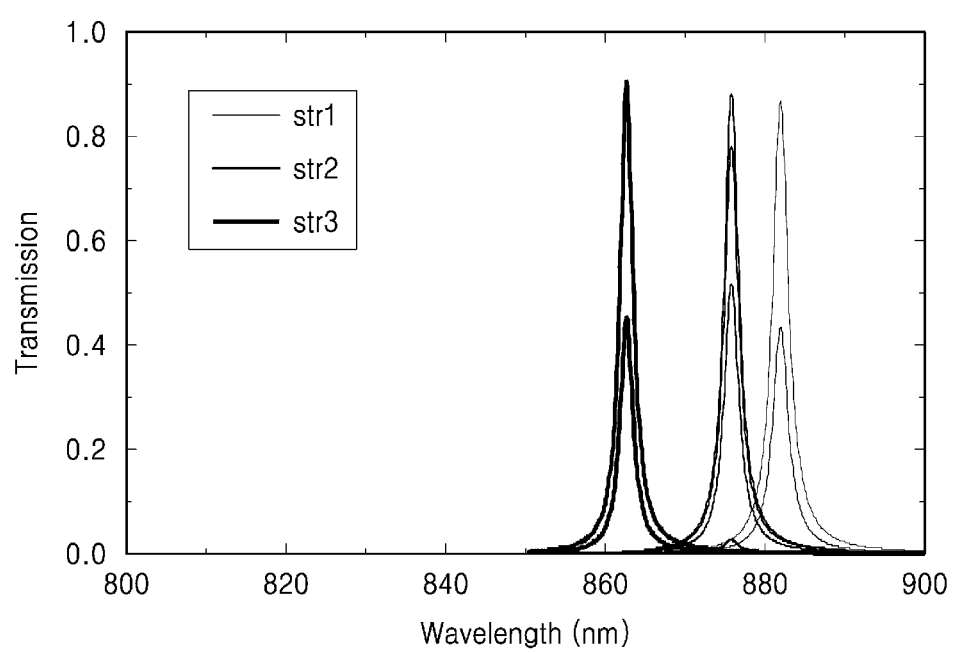
FIG. 8 shows graphs illustrating an example of transmission properties of the polarization spectral filter illustrated in FIG. 7.

FIG. 8 illustrates graphs illustrating an example of transmission properties of the polarization spectral filter 300 of FIG. 7. In FIG. 8, a graph marked as "str1" represents a case where the ratio (W1/W2) between the first grating elements 120a and the second grating elements 120b is 0.7, a graph marked as "str2" represents a case where the ratio (W1/W2) between the first grating elements 120a and the second grating elements 120b is 0.5, and a graph marked as "str3" represents a case where the ratio (W1/W2) between the first grating elements 120a and the second grating elements 120b is 0.3. Referring to FIG. 8, when the band pass filter 140 is used, light having a polarization component parallel to the longitudinal direction of the first grating elements 120a and the second grating elements 120b of the grating layer 120 passes through the polarization spectral filter 300, and a wavelength band of light passing through the polarization spectral filter 300 may be adjusted according to the ratio (W1/W2) between the first grating elements 120a and the second grating elements 120b.

The band pass filter 140 may be configured to transmit the light in a wavelength range of, for example, 800 nm to 850 nm therethrough, and configured to block the light in a wavelength range of 850 nm to 900 nm. In this case, the polarization spectral filter 300 may transmit only light having a polarization component perpendicular to the longitudinal direction of the first grating elements 120a and the second grating elements 120b therethrough. In addition, by adjusting the ratio (W1/W2) between the first grating elements 120a and the second grating elements 120b, a transmission wavelength band of the light having a polarization component perpendicular to the longitudinal direction of the first grating elements 120a and the second grating elements 120b may be adjusted.

Figure 9:
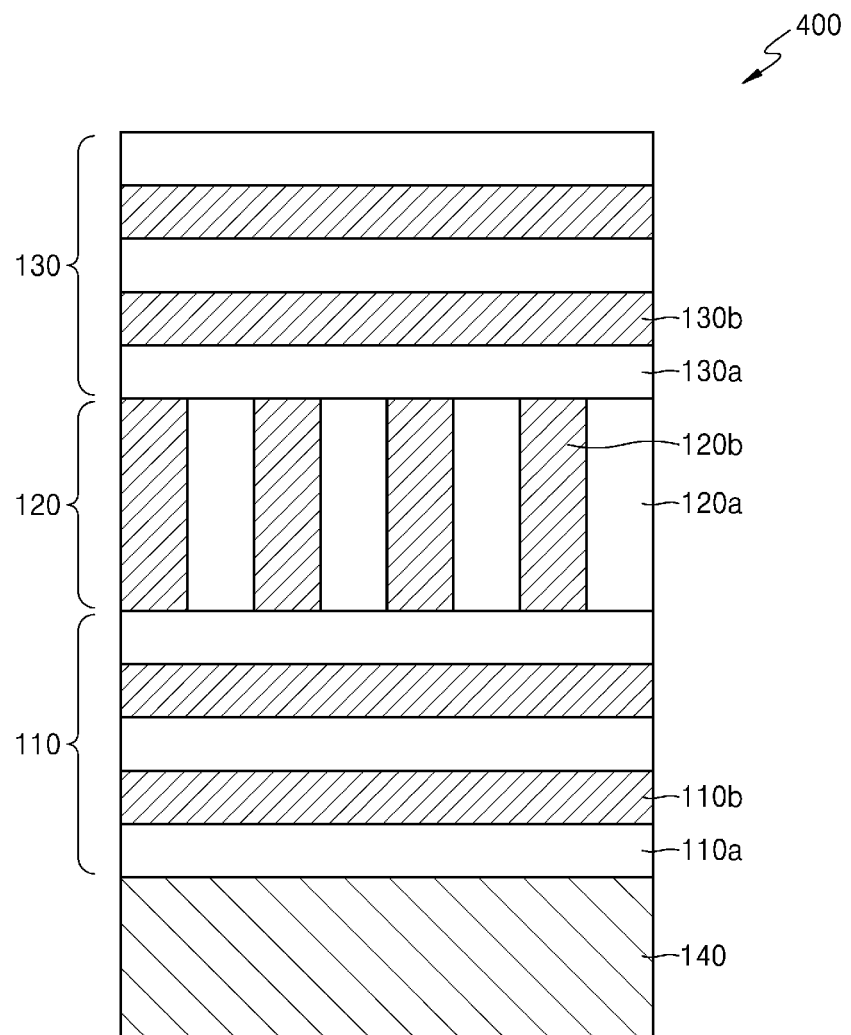
FIG. 9 is a cross-sectional view schematically illustrating a configuration of a polarization spectral filter according to example embodiment.

FIG. 9 is a cross-sectional view schematically illustrating a configuration of a polarization spectral filter according to example embodiment. While FIG. 7 illustrates that the band pass filter 140 is disposed on an upper surface of the second reflector 130, a position of the band pass filter 140 is not limited thereto. The band pass filter 140 may be disposed anywhere outside a resonator formed by the first reflector 110 and the second reflector 130. For example, referring to FIG. 9, a polarization spectral filter 400 may include the band pass filter 140 disposed on a lower surface of the first reflector 110. In other words, the band pass filter 140 may be disposed on a light emission surface of the polarization spectral filter 400.

Figure 10:
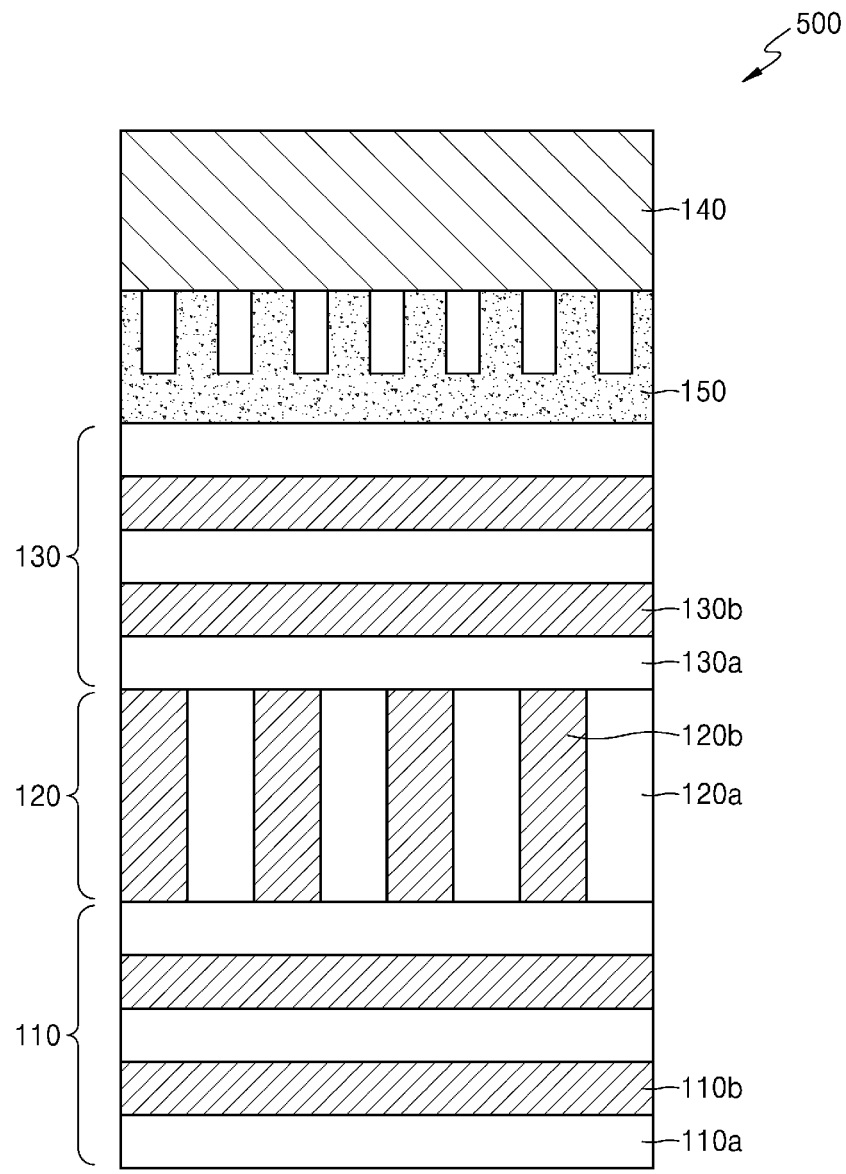
FIG. 10 is a cross-sectional view schematically illustrating a configuration of a polarization spectral filter according to example embodiment.

FIG. 10 is a cross-sectional view schematically illustrating a configuration of a polarization spectral filter according to example embodiment. Referring to FIG. 10, a polarization spectral filter 500 is similar to the configuration of the polarization spectral filter 300 illustrated in FIG. 7 and may further include a quarter wave plate 150 disposed between the band pass filter 140 and the second reflector 130. The quarter wave plate 150 serves to delay a phase of incident light by a quarter wavelength of a wavelength of the incident light beam. The quarter wave plate 150 may be formed by patterning a dielectric material having a relatively high refractive index into a nanoscale structure smaller than the wavelength of light beam. For example, the quarter wave plate 150 may be formed by a meta surface including Si, $TiO_2$, or $Si_3N_3$.

If the phase of the incident light is delayed by a quarter wavelength of the wavelength of the incident light by the quarter wave plate 150, a linear polarization component of the incident light is changed into a circular polarization component and the circular polarization component is changed into the linear polarization component. In other words, the quarter wave plate 150 may serve to change the linearly polarized light into a circularly polarized light and change the circularly polarized light into the linearly polarized light beam. For example, a first linear polarization component is changed into a first circular polarization component by the quarter wave plate 150, and a second linear polarization component perpendicular to the first linear polarization component is changed into a second circular polarization component rotated in a direction opposite to the first circular polarization component by the quarter wave plate 150. Accordingly, by using the quarter wave plate 150, light having the circular polarization component passes through the polarization spectral filter 500.

Figure 11:
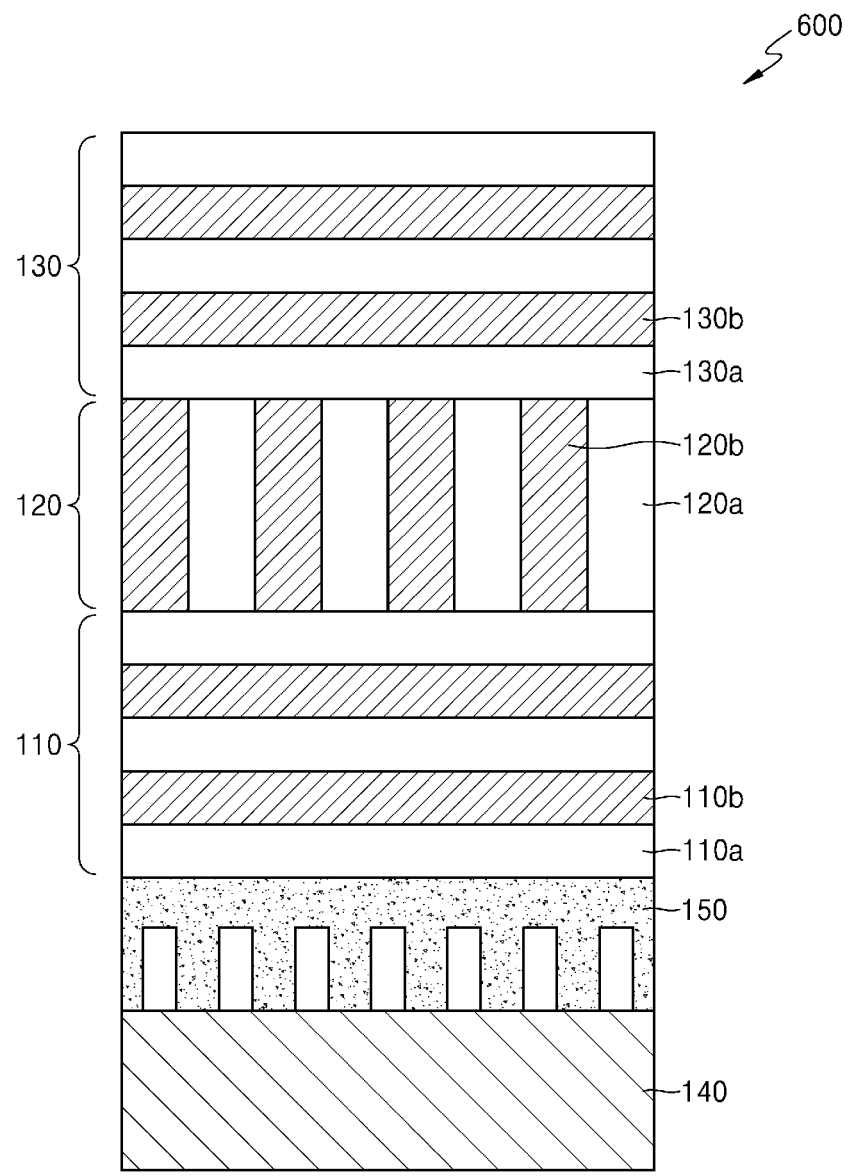
FIG. 11 is a cross-sectional view schematically illustrating a configuration of the polarization spectral filter according to example embodiment.

FIG. 11 is a cross-sectional view schematically illustrating a configuration of a polarization spectral filter according to example embodiment. While FIG. 10 illustrates that the quarter wave plate 150 is disposed on the upper surface of the second reflector 130, a position of the quarter wave plate 150 is not limited thereto. The quarter wave plate 150 may be disposed anywhere outside a resonator formed by the first reflector 110 and the second reflector 130. For example, referring to FIG. 11, a polarization spectral filter 600 may include the quarter wave plate 150 disposed on the lower surface of the first reflector 110. In other words, the quarter wave plate 150 may be disposed on a light emission surface of the polarization spectral filter 600.

In addition, in the example embodiments illustrated in FIGS. 10 and 11, a position between the quarter wave plate 150 and the band pass filter 140 may be interchanged. For example, the band pass filter 140 may be disposed on the upper surface of the second reflector 130, and the quarter wave plate 150 may be disposed on an upper surface of the band pass filter 140. In addition, the band pass filter 140 may be disposed on the lower surface of the first reflector 110, and the quarter wave plate 150 may be disposed on a lower surface of the band pass filter 140.

In addition, the quarter wave plate 150 and the band pass filter 140 may be disposed opposite to each other. For example, the quarter wave plate 150 may be disposed on the upper surface of the second reflector 130, and the band pass filter 140 may be disposed on the lower surface of the first reflector 110. Alternatively, the band pass filter 140 may be disposed on the upper surface of the second reflector 130, and the quarter wave plate 150 may be disposed on the lower surface of the first reflector 110.

The polarization spectral filter according to the example embodiments described above may transmit light in a specified wavelength band having a specified linear polarization component or a specified circular polarization component therethrough without using a separate polarization filter and/or a separate spectral filter. In addition, the polarization spectral filter according to the example embodiments described above may be made in a small size such as a pixel size of an image sensor. Accordingly, an array of the polarization spectral filters according to the example embodiments described above may be integrated with the image sensor to be used to obtain polarization information and spectral information simultaneously. In addition, by integrating the image sensor with the array of the polarization spectral filters according to the example embodiments described above, for example, a miniaturized polarization spectral image sensor that may be mounted in a small mobile device such as a smartphone may be provided.

Figure 12:
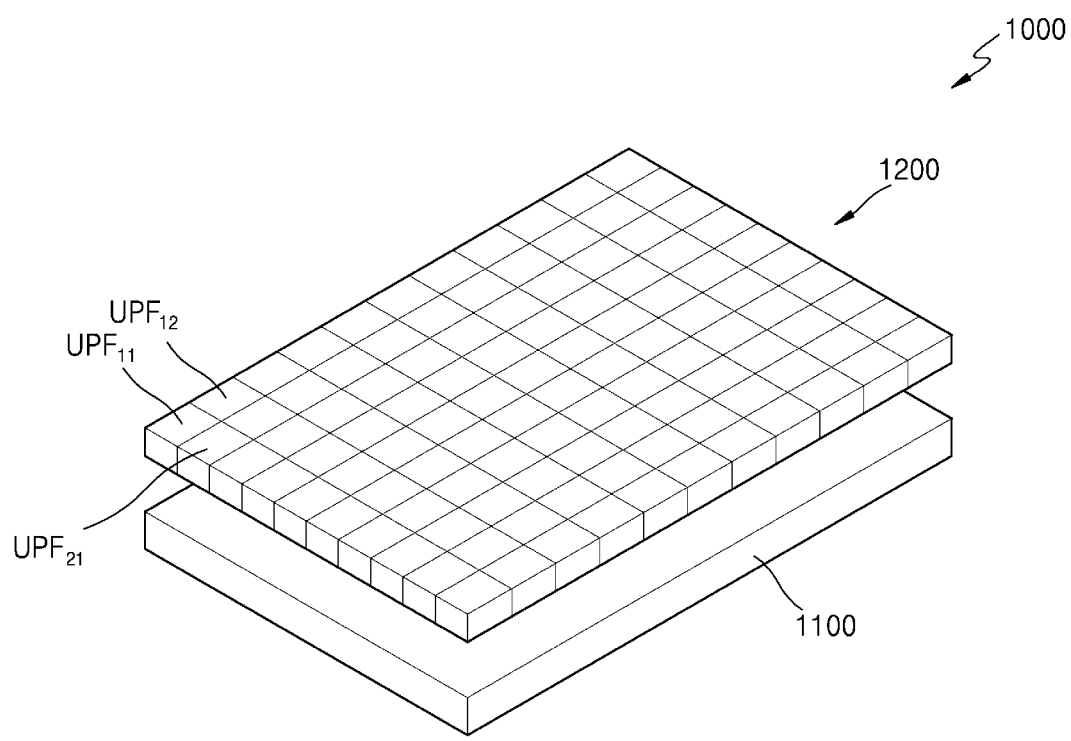
FIG. 12 is a perspective view schematically illustrating a configuration of a polarization spectral filter array and a polarization spectral sensor including the polarization spectral filter array according to an example embodiment.

FIG. 12 is a perspective view schematically illustrating a configuration of a polarization spectral filter array and a polarization spectral sensor including the polarization spectral filter array according to an example embodiment. Referring to FIG. 12, a polarization spectral sensor 1000 according to an example embodiment may include an image sensor 1100 and a polarization spectral filter array 1200 disposed on the image sensor 1100. The polarization spectral filter array 1200 may include an array of a plurality of unit filters $UPF_{11}$, $UPF_{12}$, $UPF_{21}$, . . . that are two-dimensionally arranged (e.g., arranged in columns and rows). In addition, the image sensor 1100 may include a plurality of sensing pixels that are two-dimensionally arranged and convert intensity of incident light into an electrical signal. Accordingly, the sensing pixels of the image sensor 1100 may sense intensity of the light transmitting through the polarization spectral filter array 1200.

Figure 13:
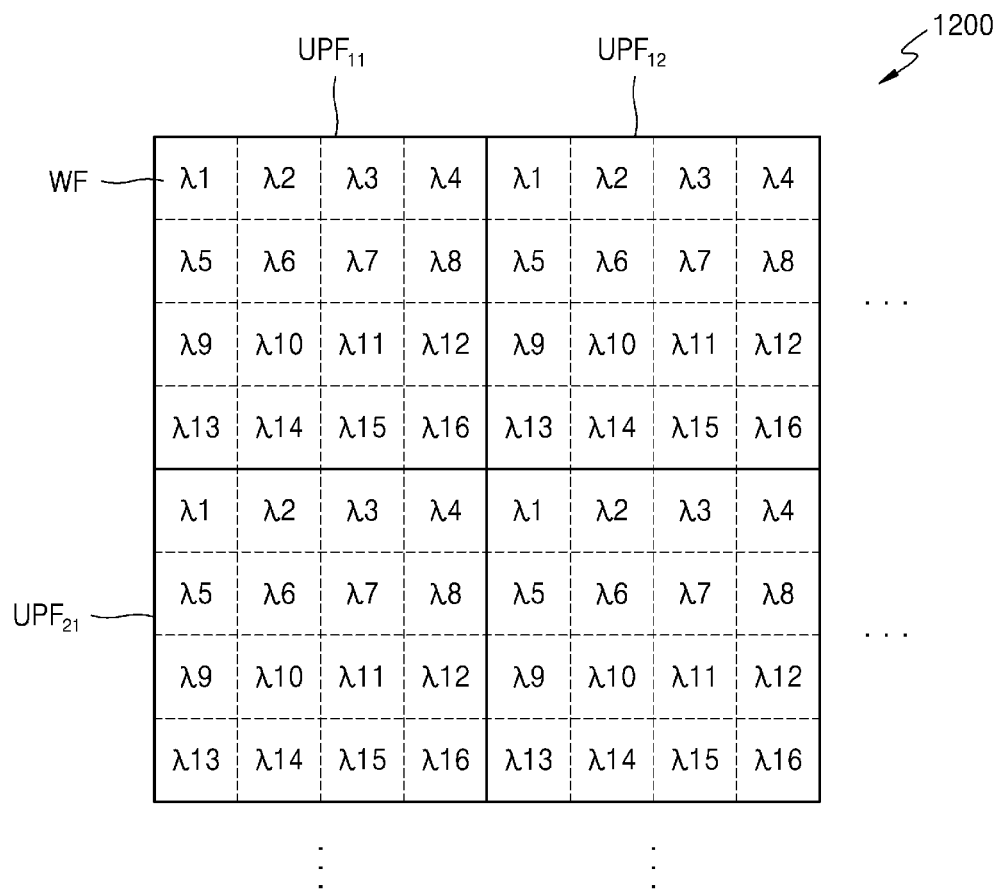
FIG. 13 illustrates an example of a configuration of the polarization spectral filter array illustrated in FIG. 12.

FIG. 13 illustrates an example of a configuration of the polarization spectral filter array 1200 illustrated in FIG. 12. Referring to FIG. 13, the polarization spectral filter array 1200 may include the plurality of unit filters $UPF_{11}$, $UPF_{12}$, $UPF_{21}$, . . . that are two-dimensionally arranged. Each of the unit filters $UPF_{11}$, $UPF_{12}$, $UPF_{21}$, . . . of the polarization spectral filter array 1200 may be configured to analyze a plurality of different polarization states for light having a plurality of different wavelengths. Each of the unit filters $UPF_{11}$, $UPF_{12}$, $UPF_{21}$, . . . is a minimum unit of the polarization spectral filter array 1200 for simultaneously obtaining both polarization information and spectral information on incident light.

Each of the unit filters $UPF_{11}$, $UPF_{12}$, $UPF_{21}$, . . . may include a set WF of the plurality of polarization spectral filters through which the light having different wavelengths transmits. FIG. 13 illustrates an example in which each of the unit filters $UPF_{11}$, $UPF_{12}$, $UPF_{21}$, . . . includes 16 polarization spectral filter sets WF through which light λ1 through λ16 in first through sixteenth wavelength bands respectively transmit. However, the number of polarization spectral filters sets WF arranged in each of the unit filters $UPF_{11}$, $UPF_{12}$, $UPF_{21}$, . . . is not limited thereto, and more polarization spectral filter sets WF may be arranged, or less polarization spectral filter sets WF may be arranged. The plurality of polarization spectral filters WF may be arranged in the form of a two-dimensional array within each of the unit filters $UPF_{11}$, $UPF_{12}$, $UPF_{21}$, . . . .

Figure 14:
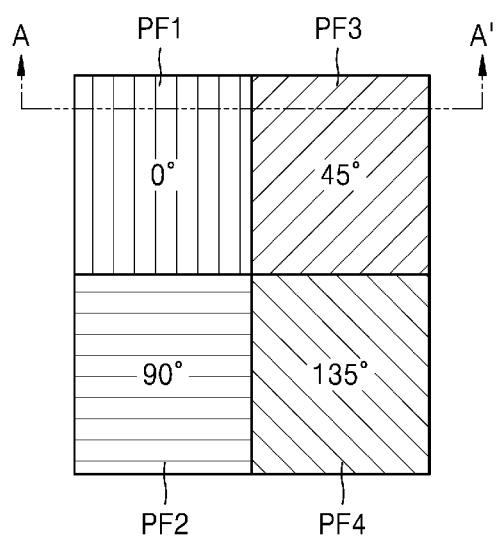
FIG. 14 illustrates an example of an arrangement of polarization spectral filters in one polarization spectral filter set of the polarization spectral filter array illustrated in FIG. 12.

FIG. 14 illustrates an example of an arrangement of the polarization spectral filters in one polarization spectral filter set WF of each of the unit filter arrays $UPF_{11}$, $UPF_{12}$, $UPF_{21}$, . . . of the polarization spectral filter array 1200 illustrated in FIG. 12. Referring to FIG. 14, each polarization spectral filter set WF may include, for example, first to fourth polarization spectral filters PF1, PF2, PF3, and PF4 arranged in the form of a 2×2 array. The first to the fourth polarization spectral filters PF1, PF2, PF3, and PF4 may be configured to transmit light having linear polarization components in different directions therethrough. For example, the first polarization spectral filter PF1 may be configured to transmit the light having the first linear polarization component therethrough. The second polarization spectral filter PF2 may be configured to transmit the light having the second linear polarization component perpendicular to the first linear polarization component therethrough. The third polarization spectral filter PF3 may be configured to transmit light having a third linear polarization component that is inclined 45 degrees with respect to the first linear polarization component therethrough. In addition, the fourth polarization spectral filter PF4 may be configured to transmit light having a fourth linear polarization component inclined 135 degrees with respect to the first linear polarization component therethrough.

Figure 15:
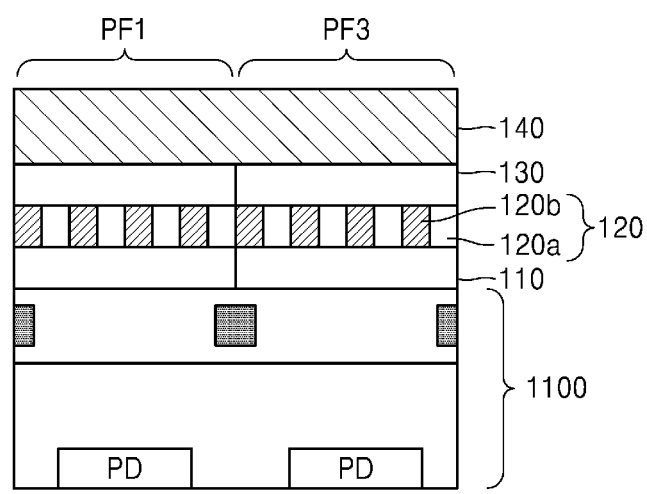
FIG. 15 is a cross-sectional view taken along line A-A' of FIG. 14.

FIG. 15 is a cross-sectional view taken along line A-A' of FIG. 14. FIG. 15 schematically illustrates an example of an arrangement of the polarization spectral filters in one polarization spectral filter set WF illustrated in FIG. 14 and a partial configuration of the polarization spectral sensor 1000 including the image sensor 1100. Referring to FIG. 15, the first and the third polarization spectral filters PF1 and PF3 may have the same structure as, for example, the structure of the polarization spectral filter 300 illustrated in FIG. 7. While FIG. 15 illustrates only the first and the third polarization spectral filters PF1 and PF3, it should be understood that the above descriptions may equally apply to the first to the fourth polarization spectral filters PF1, PF2, PF3, and PF4. In other words, each of the first to the fourth polarization spectral filters PF1, PF2, PF3, and PF4 may include the first reflector 110, the grating layer 120, the second reflector 130, and the band pass filter 140. In the first to the fourth polarization spectral filters PF1, PF2, PF3, and PF4, the first reflector 110, the second reflector 130, and the band pass filter 140 may extend integrally with each other as a common configuration.

The plurality of the first and the second grating elements 120a and 120b of the grating layer 120 may be arranged along different directions in the first to the fourth polarization spectral filters PF1, PF2, PF3, and PF4 such that the first to the fourth polarization spectral filters PF1, PF2, PF3, and PF4 to transmit the light having different linear polarization components therethrough. For example, the first and the second grating elements 120a and 120b of the grating layer 120 of the second polarization spectral filter PF2 may be arranged perpendicularly to the first and the second grating elements 120a and 120b of the grating layer 120 of the first polarization spectral filter PF1. In other words, the first and the second grating elements 120a and 120b of the grating layer 120 of the second polarization spectral filter PF2 may be rotated 90 degrees on a horizontal plane with respect to the first and the second grating elements 120a and 120b of the grating layer 120 of the first polarization spectral filter PF1.

In addition, the first and the second grating elements 120a and 120b of the third polarization spectral filter PF3 may be arranged to be inclined 45 degrees with respect to the first and the second grating elements 120a and 120b of the first polarization spectral filter PF1. In other words, the first and the second grating elements 120a and 120b of the grating layer 120 of the third polarization spectral filter PF3 may be rotated 45 degrees on the horizontal plane with respect to the first and the second grating elements 120a and 120b of the grating layer 120 of the first polarization spectral filter PF1. In addition, the first and the second grating elements 120a and 120b of the fourth polarization spectral filter PF4 may be arranged to be inclined 135 degrees with respect to the first and the second grating elements 120a and 120b of the first polarization spectral filter PF1. In other words, the first and the second grating elements 120a and 120b of the grating layer 120 of the fourth polarization spectral filter PF4 may be rotated 135 degrees on the horizontal plane with respect to the first and the second grating elements 120a and 120b of the grating layer 120 of the first polarization spectral filter PF1.

The first to the fourth polarization spectral filters PF1, PF2, PF3, and PF4 arranged in one same polarization spectral filter set WF may be configured to transmit light having the same wavelength band therethrough. As described above, the transmission bands of the first to the fourth polarization spectral filters PF1, PF2, PF3, and PF4 may be determined by the thickness T of the first grating elements 120a and the second grating elements 120b, the arrangement period P of the plurality of first grating elements 120a and the plurality of second grating elements 120b, the ratio (W1/W2) between the first grating elements 120a and the second grating elements 120b, and the like. Accordingly, in one same polarization spectral filter set WF, the thicknesses T of the first grating elements 120a and the second grating elements 120b of the first to the fourth polarization spectral filters PF1, PF2, PF3, and PF4 may be the same, and the arrangement periods P of the plurality of first grating elements 120a and the plurality of second grating elements 120b may be the same, and the ratios (W1/W2) between the first grating elements 120a and the second grating elements 120b may be the same.

Light transmitted through the first to the fourth polarization spectral filters PF1, PF2, PF3, and PF4 may be incident on different pixels of the image sensor 1100. To this end, the first to the fourth polarization spectral filters PF1, PF2, PF3, and PF4 may arranged to correspond one-to-one to the pixels of the image sensor 1100, respectively. Based on this configuration, by analyzing electrical signals output from pixels corresponding to the first to the fourth polarization spectral filters PF1, PF2, PF3, and PF4 of the image sensor 1100, information on intensity of light having the first linear polarization component, intensity of light having the second linear polarization component, intensity of light having the third linear polarization component, and intensity of light having the fourth linear polarization component may be extracted from among the light beams having the same wavelength band.

Each of the polarization spectral filter sets WF may include the first to the fourth polarization spectral filters PF1, PF2, PF3, and PF4. The first to the fourth polarization spectral filters PF1, PF2, PF3, and PF4 arranged in different polarization spectral filter sets WF may be configured to transmit the light in different wavelength bands therethrough. For example, the first to the fourth polarization spectral filters PF1, PF2, PF3, and PF4 in the polarization spectral filter set WF for analyzing the linear polarization component of the light $\lambda 1$ in a first wavelength band may be configured to transmit the light $\lambda 1$ in the first wavelength band, and the first to the fourth polarization spectral filters PF1, PF2, PF3, and PF4 in the polarization spectral filter set WF for analyzing the linear polarization component of the light $\lambda 2$ in a second wavelength band may be configured to transmit the light $\lambda 2$ in the second wavelength band.

For the sake of a convenient manufacturing process, in an example embodiment, the thicknesses T of all the first grating elements 120a and the second grating elements 120b may be the same in the polarization spectral filter array 1200. In this case, the transmission bands of the first to the fourth polarization spectral filters PF1, PF2, PF3, and PF4 may be determined mainly by the arrangement periods P of the plurality of first grating elements 120a and the plurality of second grating elements 120b, and/or the ratio (W1/W2) between the first grating element 120a and the second grating element 120b. In an example embodiment, the first to the fourth polarization spectral filters PF1, PF2, PF3, and PF4 respectively arranged in the different polarization spectral filter sets WF may have different arrangement periods P of the plurality of first grating elements 120a and the plurality of second grating elements 120b, and/or may have different ratios (W1/W2) between the first grating elements 120a and the second grating elements 120b.

In an example embodiment, the thicknesses T and the arrangement periods P of all the plurality of first grating elements 120a and the plurality of second grating elements 120b may be the same in the polarization spectral filter array 1200. In this case, the first to the fourth polarization spectral filters PF1, PF2, PF3, and PF4 respectively arranged in different polarization spectral filter sets WF may have different ratios (W1/W2) between the first grating elements 120a and the second grating elements 120b.

In addition, the transmission bands of the first to the fourth polarization spectral filters PF1, PF2, PF3, and PF4 may also be determined by a pass band of the band pass filter 140. For example, the pass bands of the band pass filters 140 in the different polarization spectral filter sets WF may be different. In another example, one common band pass filter 140 may be used in the entire polarization spectral filter array 1200. In this case, the band pass filter 140 may be configured to transmit the light beams $\lambda 1$ to $\lambda 16$ in first to sixteenth wavelength bands therethrough and configured to block light in the remaining wavelength bands.

Figure 16:
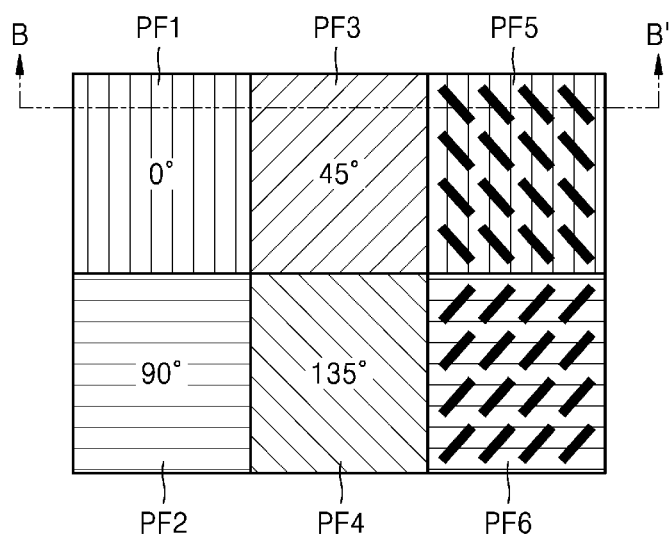
FIG. 16 illustrates another example of the arrangement of the polarization spectral filters in the one polarization spectral filter set of the polarization spectral filter array illustrated in FIG. 12.
Figure 17:
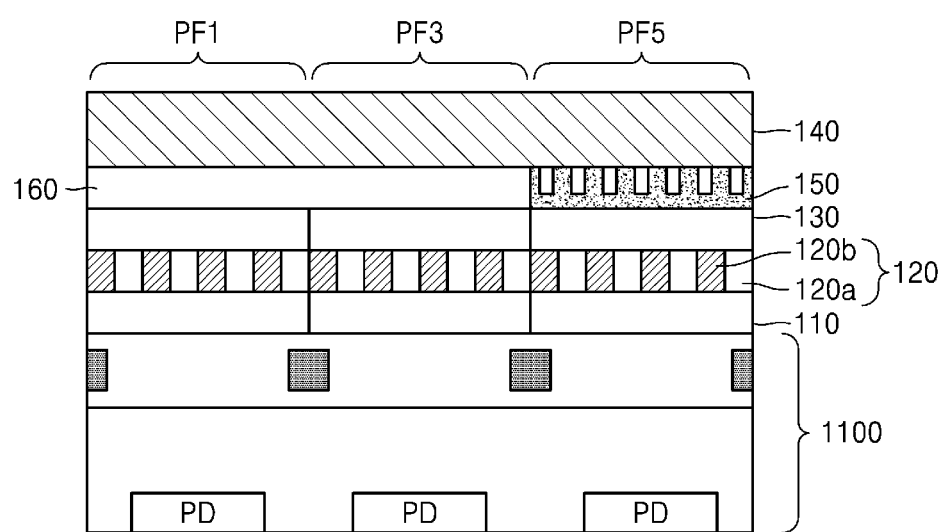
FIG. 17 illustrates an example of a cross-sectional view taken along line B-B' of FIG. 16.

FIG. 16 illustrates another example of the arrangement of the polarization spectral filters in one polarization spectral filter set WF of each of the unit filter arrays $UPF_{11}$, $UPF_{12}$, $UPF_{21}$, . . . of the polarization spectral filter array 1200 illustrated in FIG. 12. In addition, FIG. 17 illustrates an example of a cross-sectional view taken along line B-B' of FIG. 16. FIG. 17 schematically illustrates an example of a partial configuration of an arrangement of the polarization spectral filters in one polarization spectral filter set WF illustrated in FIG. 16 and a partial configuration of the polarization spectral sensor 1000 including the image sensor 1100.

Referring to FIG. 16, each polarization spectral filter set WF may include, for example, first to sixth polarization spectral filters PF1, PF2, PF3, PF4, PF5, and PF6 arranged in the form of a 2×3 array. The first to the fourth polarization spectral filters PF1, PF2, PF3, and PF4 may be configured to transmit light having linear polarization components in different directions therethrough. Since configurations and operations of the first to the fourth polarization spectral filters PF1, PF2, PF3, and PF4 are the same as the configuration and operation described above with reference to FIG. 14, description thereof will be omitted.

The fifth polarization spectral filter PF5 may be configured to transmit the light having a first circular polarization component therethrough and the sixth polarization spectral filter PF6 may be configured to transmit the light having a second circular polarization component rotated in a direction opposite to the first circular polarization component. To this end, the fifth polarization spectral filter PF5 may further include the quarter wave plate 150 disposed between the second reflector 130 and the band pass filter 140, as illustrated in FIG. 17. Although not illustrated in FIG. 17, the sixth polarization spectral filter PF6 may further include the quarter wave plate 150 disposed between the second reflector 130 and the band pass filter 140. Accordingly, configurations of the fifth polarization spectral filter PF5 and the sixth polarization spectral filter PF6 may be the same as the configuration of the polarization spectral filter 500 illustrated in FIG. 10.

The first and the second grating elements 120a and 120b of the grating layer 120 of the fifth polarization spectral filter PF5 may be arranged in parallel to the first and the second grating elements 120a and 120b of the grating layer 120 of the first polarization spectral filter PF1. On the other hand, the first and the second grating elements 120a and 120b of the grating layer 120 of the sixth polarization spectral filter PF6 may be arranged perpendicularly to the first and the second grating elements 120a and 120b of the grating layer 120 of the first polarization spectral filter PF1. Accordingly, the first and the second grating elements 120a and 120b of the grating layer 120 of the sixth polarization spectral filter PF6 may be arranged in parallel to the first and the second grating elements 120a and 120b of the grating layer 120 of the second polarization spectral filter PF2. Accordingly, the light transmitted through the fifth polarization spectral filter PF5 and the light transmitted through the sixth polarization spectral filter PF6 may have information on circular polarization components rotated in opposite directions.

According to the example embodiments illustrated in FIGS. 16 and 17, by analyzing electrical signals output from pixels corresponding to the first to sixth polarization spectral filters PF1, PF2, PF3, PF4, PF5, and PF6 of the image sensor 1100, information on intensity of light having various linear polarization components and intensity of light having a circular polarization component may be extracted from light in the same wavelength band.

As illustrated in FIG. 17, the first to the fourth polarization spectral filters PF1, PF2, PF3, and PF4 may further include a spacer 160 disposed on the second reflector 130 to maintain a constant position of the band pass filter 140 in a thickness direction. A thickness of the spacer 160 may be the same as the thickness of the quarter wave plate 150.

Figure 18:
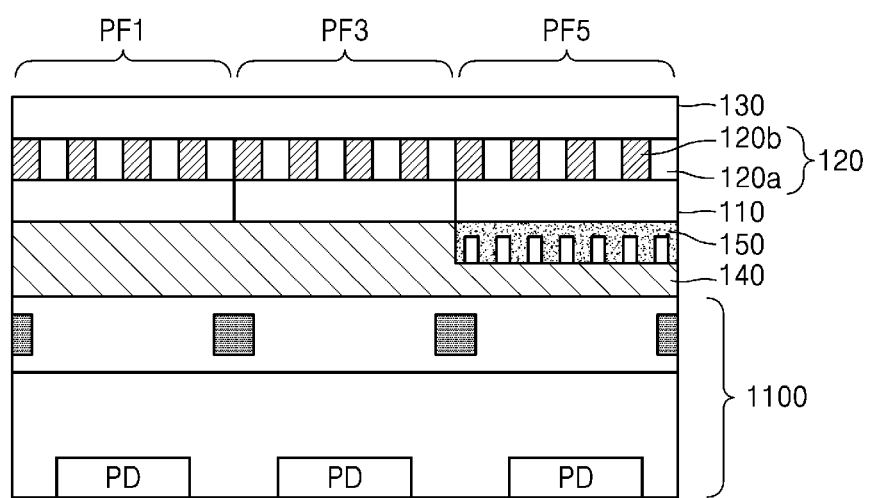
FIG. 18 illustrates another example of a cross-sectional view taken along line B-B' of FIG. 16.

FIG. 18 illustrates another example of a cross-sectional view taken along line B-B' of FIG. 16. FIG. 18 schematically illustrates another example of an arrangement of the polarization spectral filters in one polarization spectral filter set WF illustrated in FIG. 16 and a partial configuration of the polarization spectral sensor 1000 including the image sensor 1100. Referring to FIG. 18, the band pass filter 140 may be disposed under the first reflector 110. In this case, the band pass filter 140 may be disposed to face the image sensor 1100. In addition, in the fifth and sixth polarization spectral filters PF5 and PF6, the quarter wave plate 150 may be disposed between the first reflector 110 and the band pass filter 140. In the example embodiment illustrated in FIG. 18, the quarter wave plate 150 may be buried in the band pass filter 140. Then, a separate spacer may not be used.

Figure 19:
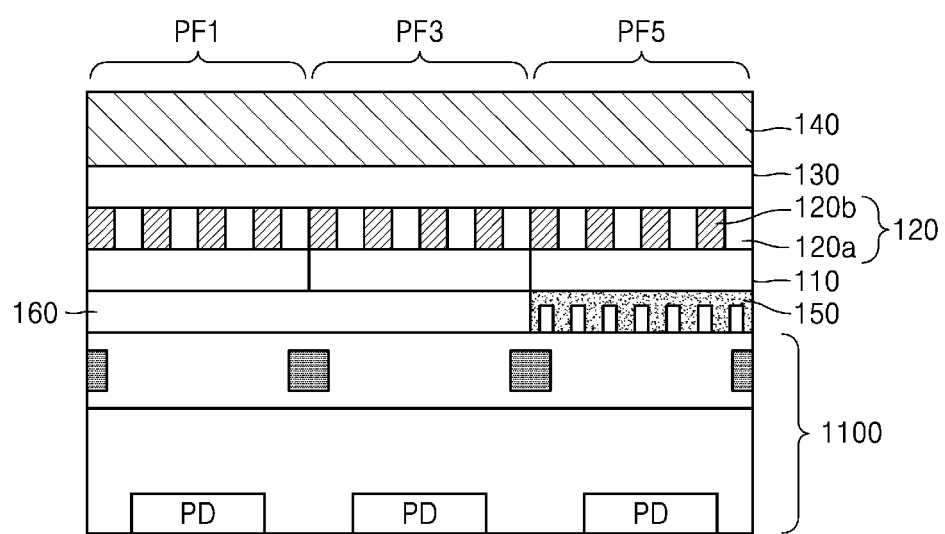
FIG. 19 illustrates yet another example of a cross-sectional view taken along line B-B' of FIG. 16.

FIG. 19 illustrates yet another example of a cross-sectional view taken along line B-B' of FIG. 16. FIG. 19 schematically illustrates a yet another example of an arrangement of the polarization spectral filters in one polarization spectral filter set WF illustrated in FIG. 16 and a partial configuration of the polarization spectral sensor 1000 including the image sensor 1100. Referring to FIG. 19, the band pass filter 140 may be disposed on an upper surface of the second reflector 130, and the quarter wave plate 150 may be disposed on a lower surface of the first reflector 110 in the fifth and sixth polarization spectral filters PF5 and PF6. In addition, the spacer 160 may be further disposed on the lower surface of the first reflector 110 of the first to the fourth polarization spectral filters PF1, PF2, PF3, and PF4. A thickness of the spacer 160 may be the same as the thickness of the quarter wave plate 150.

Although the polarization spectral filter, the polarization spectral filter array, and the polarization spectral sensor are described with reference to the example embodiments illustrated in the drawings, these embodiments are merely examples, and it will be understood that various modifications and equivalent other embodiments may be implemented by those skilled in the art. Therefore, the disclosed embodiments should be considered in descriptive sense only and not for the purpose of limitation. The scope of rights is set forth in the claims rather than the foregoing description, and all differences within the scope shall be construed as being included in the scope of rights.

While the disclosure has been particularly illustrated and described with reference to example embodiments thereof, it will be understood that various changes in form and details may be made therein without departing from the spirit and scope of the following claims.

What is claimed is:

1. A polarization spectral filter comprising:
   a first reflector;
   a second reflector, the first reflector and the second reflector being disposed to face each other in a first direction; and
   a grating layer disposed between the first reflector and the second reflector,
   wherein the grating layer comprises a plurality of first grating elements and a plurality of second grating elements, the plurality of first grating elements and the plurality of second grating elements being alternately arranged with each other in a second direction perpendicular to the first direction,
   wherein each of the plurality of first grating elements includes a first dielectric material having a first refractive index,
   wherein each of the plurality of second grating elements includes a second dielectric material having a second refractive index different from the first refractive index, and
   wherein each of the first reflector and the second reflector is formed by stacking alternately two dielectric layers having different refractive indices, the different refractive indices including the first refractive index and the second refractive index.

2. The polarization spectral filter of claim 1, wherein each of the plurality of first grating elements and the plurality of second grating elements has a rod shape, and the plurality of first grating elements and the plurality of second grating elements are arranged one-dimensionally.

3. The polarization spectral filter of claim 1, wherein a first surface of each of the plurality of first grating elements and a first surface of each of the plurality of second grating elements are in contact with the first reflector, and
wherein a second surface of each of the plurality of first grating elements, opposite to the first surface of each of the plurality of first grating elements, and a second surface of each of the plurality of second grating elements, opposite to the first surface of each of the plurality of second grating elements, are in contact with the second reflector.

4. The polarization spectral filter of claim 1, wherein, based on at least one of thicknesses of the plurality of first grating elements and the plurality of second grating elements, arrangement periods of the plurality of first grating elements and arrangement periods of the plurality of second grating elements, and a ratio of the plurality of first grating elements to the plurality of second grating elements, the polarization spectral filter is configured to transmit therethrough light in a first wavelength band, from among light having a first linear polarization component, and transmit therethrough light in a second wavelength band different from the first wavelength band, from among light having a second linear polarization component perpendicular to the first linear polarization component.

5. The polarization spectral filter of claim 4, wherein the thicknesses of each of the plurality of first grating elements and each of the plurality of second grating elements are approximately 90 nm to approximately 350 nm.

6. The polarization spectral filter of claim 4, wherein the arrangement periods of the plurality of first grating elements and the arrangement periods of the plurality of second grating elements are in a range from approximately 150 nm to approximately 300 nm.

7. The polarization spectral filter of claim 4, wherein the ratio of the plurality of first grating elements to the plurality of second grating elements is in a range from 0.2 to 0.7.

8. The polarization spectral filter of claim 4, wherein the first dielectric material and the second dielectric material are transparent with respect to the light in the first wavelength band and the light in the second wavelength band.

9. The polarization spectral filter of claim 4, further comprising a band pass filter disposed on a surface of the first reflector, the band pass filter being configured to block the light in the first wavelength band and to transmit therethrough the light in the second wavelength band.

10. The polarization spectral filter of claim 1, further comprising a quarter wave plate disposed on a surface of the first reflector.

11. The polarization spectral filter of claim 1, wherein the first reflector comprises a plurality of first dielectric layers and a plurality of second dielectric layers, the plurality of first dielectric layers and the plurality of second dielectric layers being alternately stacked with each other in a third direction,
wherein the second reflector comprises a plurality of third dielectric layers and a plurality of fourth dielectric layers, the plurality of third dielectric layers and the plurality of fourth dielectric layers being alternately stacked with each other in the third direction,
wherein each of the plurality of first dielectric layers includes a dielectric material having a refractive index that is different from a dielectric material included in each of the plurality of second dielectric layers, and
wherein each of the plurality of third dielectric layers includes a dielectric material having a refractive index that is different from a dielectric material included in each of the plurality of fourth dielectric layers.

12. The polarization spectral filter of claim 11, wherein each of the plurality of first dielectric layers and each of the plurality of third dielectric layers include the first dielectric material, and
wherein each of the plurality of second dielectric layers and each of the plurality of fourth dielectric layers include the second dielectric material.

13. The polarization spectral filter of claim 1, wherein the grating layer further comprises a plurality of third grating elements, each of the plurality of third grating elements including a third dielectric material having a third refractive index different from the first refractive index and the second refractive index, and
wherein the plurality of first grating elements, the plurality of second grating elements, and the plurality of third grating elements are alternately with each other arranged in the second direction.

14. A polarization spectral filter array, comprising:
a plurality of unit filter arrays that are two-dimensionally arranged,
wherein each of the plurality of unit filter arrays comprises:
a first polarization spectral filter set configured to transmit therethrough light in a first wavelength band; and
a second polarization spectral filter set configured to transmit therethrough light in a second wavelength band different from the first wavelength band,
wherein the first polarization spectral filter set comprises:
a first polarization spectral filter configured to transmit therethrough light having a first linear polarization component, from among the light in the first wavelength band; and
a second polarization spectral filter configured to transmit therethrough light having a second linear polarization component perpendicular to the first linear polarization component, from among the light in the first wavelength band,
wherein the second polarization spectral filter set comprises:
a third polarization spectral filter configured to transmit therethrough the light having the first linear polarization component, from among the light in the second wavelength band; and
a fourth polarization spectral filter configured to transmit therethrough the light having the second linear polarization component, from among the light in the second wavelength band,
wherein each of the first polarization spectral filter, the second polarization spectral filter, the third polarization spectral filter, and the fourth polarization spectral filter comprises:
a first reflector and a second reflector disposed to face each other in a first direction; and
a grating layer disposed between the first reflector and the second reflector, wherein the grating layer comprises a plurality of first grating elements and a plurality of second grating elements, the plurality of first grating elements and the plurality of second grating elements being alternately arranged with each other in a second direction perpendicular to the first direction, wherein each of the plurality of first grating elements includes a first dielectric material having a first refractive index, and wherein each of the plurality of second grating elements includes a second dielectric material having a second refractive index different from the first refractive index.

15. The polarization spectral filter array of claim 14, wherein the plurality of first grating elements and the plurality of second grating elements of the grating layer of the second polarization spectral filter are rotated by 90 degrees, on a plane perpendicular to the first direction, with respect to the plurality of first grating elements and the plurality of second grating elements of the grating layer of the first polarization spectral filter, and wherein the plurality of first grating elements and the plurality of second grating elements of the grating layer of the fourth polarization spectral filter are rotated by 90 degrees, on the plane perpendicular to the first direction, with respect to the plurality of first grating elements and the plurality of second grating elements of the grating layer of the third polarization spectral filter.

16. The polarization spectral filter array of claim 15, wherein each of the plurality of first grating elements and each of the plurality of second grating elements have a rod shape, and the plurality of first grating elements and the plurality of second grating elements are one-dimensionally arranged.

17. The polarization spectral filter array of claim 15, wherein, with respect to each of the first polarization spectral filter, the second polarization spectral filter, the third polarization spectral filter, and the fourth polarization spectral filter, based on at least one of thicknesses of the plurality of first grating elements and the plurality of second grating elements, arrangement periods of the plurality of first grating elements and arrangement periods of the plurality of second grating elements, and a ratio of the plurality of first grating elements to the plurality of second grating elements, the first polarization spectral filter is further configured to transmit therethrough the light in the first wavelength band from among the light having the first linear polarization component, the second polarization spectral filter is further configured to transmit therethrough the light in the first wavelength band from among the light having the second linear polarization component, the third polarization spectral filter is further configured to transmit therethrough the light in the second wavelength band from among the light having the first linear polarization component, and the fourth polarization spectral filter is further configured to transmit therethrough the light in the second wavelength band from among the light having the second linear polarization component.

18. The polarization spectral filter array of claim 17, wherein a width and the thickness of each of the plurality of first grating elements of the first polarization spectral filter, a width and the thickness of each of the plurality of second grating elements of the first polarization spectral filter, and the ratio of the plurality of first grating elements to the plurality of second grating elements of the first polarization spectral filter are respectively the same as a width and the thickness of each of the plurality of first grating elements of the second polarization spectral filter, a width and the thickness of each of the plurality of second grating elements of the second polarization spectral filter, and the ratio of the plurality of first grating elements to the plurality of second grating elements of the second polarization spectral filter, and wherein a width and the thickness of each of the plurality of first grating elements of the third polarization spectral filter, a width and the thickness of each of the plurality of second grating elements of the third polarization spectral filter, and the ratio of the plurality of first grating elements to the plurality of second grating elements of the third polarization spectral filter are respectively the same as a width and the thickness of each of the plurality of first grating elements of the fourth polarization spectral filter, a width and the thickness of each of the plurality of second grating elements of the fourth polarization spectral filter, and the ratio of the plurality of first grating elements to the plurality of second grating elements of the fourth polarization spectral filter.

19. The polarization spectral filter array of claim 14, wherein each of the first polarization spectral filter, the second polarization spectral filter, the third polarization spectral filter, and the fourth polarization spectral filter further comprises a band pass filter disposed on a surface of the first reflector, the band pass filter being configured to transmit therethrough the light in the first wavelength band and the second wavelength band and to block light in other wavelength bands.

20. The polarization spectral filter array of claim 14,
wherein the first polarization spectral filter set further includes a fifth polarization spectral filter configured to transmit therethrough light having a third linear polarization component rotated by 45 degrees with respect to the first linear polarization component, from among the light in the first wavelength band, wherein the second polarization spectral filter set further includes a sixth polarization spectral filter configured to transmit therethrough the light having the third linear polarization component rotated by 45 degrees with respect to the first linear polarization component, from among the light in the second wavelength band, and wherein each of the fifth polarization spectral filter and the sixth polarization spectral filter includes the first reflector, the second reflector, and the grating layer.

21. The polarization spectral filter array of claim 20, wherein the plurality of first grating elements and the plurality of second grating elements of the grating layer of the fifth polarization spectral filter are rotated by 45 degrees, on a plane perpendicular to the first direction, with respect to the plurality of first grating elements and the plurality of second grating elements of the grating layer of the first polarization spectral filter, and wherein the plurality of first grating elements and the plurality of second grating elements of the grating layer of the sixth polarization spectral filter are rotated by 45 degrees, on the plane perpendicular to the first direction, with respect to the plurality of first grating elements and the plurality of second grating elements of the grating layer of the third polarization spectral filter.

22. The polarization spectral filter array of claim 14, wherein the first polarization spectral filter set further includes a fifth polarization spectral filter configured to transmit therethrough the light having the first linear polarization component from among the light having the first wavelength band,
  wherein the second polarization spectral filter set further includes a sixth polarization spectral filter configured to transmit therethrough the light having the first linear polarization component from among the light in the second wavelength band, and
  wherein each of the fifth polarization spectral filter and the sixth polarization spectral filter includes the first reflector, the second reflector, the grating layer, and a quarter wave plate disposed on a surface of the first reflector.

23. A polarization spectral sensor comprising:
a polarization spectral filter array including a plurality of unit filter arrays arranged two-dimensionally; and
an image sensor including a plurality of sensing pixels arranged two-dimensionally, the plurality of sensing pixels being configured to sense intensity of light transmitting through the polarization spectral filter array,
wherein each of the plurality of unit filter arrays comprises:
  a first polarization spectral filter set through which light in a first wavelength band transmits; and
  a second polarization spectral filter set through which light in a second wavelength band different from the first wavelength band transmits,
wherein the first polarization spectral filter set comprises:
  a first polarization spectral filter configured to transmit therethrough light having a first linear polarization component, from among the light in the first wavelength band; and
  a second polarization spectral filter configured to transmit therethrough light having a second linear polarization component perpendicular to the first linear polarization component, from among the light having the first wavelength band,
wherein the second polarization spectral filter set comprises:
  a third polarization spectral filter configured to transmit therethrough the light having the first linear polarization component, from among the light in the second wavelength band; and
  a fourth polarization spectral filter configured to transmit therethrough the light having the second linear polarization component, from among the light in the second wavelength band,
wherein each of the first polarization spectral filter, the second polarization spectral filter, the third polarization spectral filter, and the fourth polarization spectral filter comprises:
  a first reflector and a second reflector disposed to face each other in a first direction; and
  a grating layer disposed between the first reflector and the second reflector,
wherein the grating layer comprises a plurality of first grating elements and a plurality of second grating elements, the plurality of first grating elements and the plurality of second grating elements being alternately arranged with each other in a second direction perpendicular to the first direction,
wherein each of the plurality of first grating elements includes a first dielectric material having a first refractive index, and
wherein each of the plurality of second grating elements includes a second dielectric material having a second refractive index different from the first refractive index.

* * * * *